United States Patent
Chang et al.

(10) Patent No.: US 10,192,019 B2
(45) Date of Patent: Jan. 29, 2019

(54) SEPARATION AND MINIMUM WIRE LENGTH CONSTRAINED MAZE ROUTING METHOD AND SYSTEM

(71) Applicant: Synopsys, Inc., Mountain View, CA (US)

(72) Inventors: Fong-Yuan Chang, Hsinchu (TW); Sheng-Hsiung Chen, Hsinchu (TW); Ren-Song Tsay, Hsinchu (TW); Wai-Kei Mak, Hsinchu (TW)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/496,420

(22) Filed: Sep. 25, 2014

(65) Prior Publication Data

US 2015/0089465 A1 Mar. 26, 2015

Related U.S. Application Data

(60) Provisional application No. 61/882,499, filed on Sep. 25, 2013.

(51) Int. Cl.
*G06F 17/50* (2006.01)

(52) U.S. Cl.
CPC ...... *G06F 17/5077* (2013.01); *G06F 17/5081* (2013.01); *G06F 2217/06* (2013.01)

(58) Field of Classification Search
CPC ............. G06F 17/5077; G06F 17/5081; G06F 2217/06
USPC ........................ 716/129, 130, 131, 123, 124
See application file for complete search history.

(56) References Cited

U.S. PATENT DOCUMENTS

| | | | |
|---|---|---|---|
| 4,577,276 A | 3/1986 | Dunlop et al. | |
| 5,361,214 A | 11/1994 | Aoki | |
| 5,583,788 A | 12/1996 | Kuribayashi | |
| 5,659,717 A | 8/1997 | Tse et al. | |
| 5,854,752 A | 12/1998 | Agarwal | |
| 5,917,729 A | 6/1999 | Naganuma et al. | |
| 6,014,507 A | 1/2000 | Fujii | |
| 6,099,578 A * | 8/2000 | Itoh ..................... | G06F 17/5072 716/108 |

(Continued)

OTHER PUBLICATIONS

Alexander Volkov. "Impact of Manufacturing on Routing Methodology at 32/22 nm," ISPD, pp. 139, 2011.

(Continued)

*Primary Examiner* — Phallaka Kik
(74) *Attorney, Agent, or Firm* — Alston & Bird LLP

(57) ABSTRACT

A computer implemented method for routing a first path in a circuit design is presented. The method includes iteratively building a multitude of partial-paths to route the first path by adding an incremental length to a selected previously built partial-path when the computer is invoked to route the first path in the circuit design, the adding being performed in accordance with at least a first design rule. The multitude of partial-paths start at a first location. The method further includes comparing each of the multitude of partial-paths to each other when the multitude of partial-paths end on a common second location different from the first location, and saving one of the multitude of partial-paths that leads to a shortest first path. The method further includes eliminating one of the multitude of partial-paths that are not selected to lead to the shortest first path.

17 Claims, 13 Drawing Sheets

(56) References Cited

U.S. PATENT DOCUMENTS

| | | | |
|---|---|---|---|
| 6,161,056 A | 12/2000 | Sato | |
| 6,490,713 B2 | 12/2002 | Matsumoto | |
| 6,804,810 B1 | 10/2004 | Petersen et al. | |
| 6,892,369 B2 | 5/2005 | Teig et al. | |
| 6,931,610 B1 | 8/2005 | Buch et al. | |
| 7,080,349 B1* | 7/2006 | Babcock | G03F 1/144 716/136 |
| 7,257,797 B1 | 8/2007 | Waller et al. | |
| 7,281,233 B1 | 10/2007 | Sivasubramaniam | |
| 7,506,289 B1 | 3/2009 | Champman | |
| 7,603,644 B2 | 10/2009 | Waller | |
| 7,802,208 B1 | 9/2010 | Waller et al. | |
| 7,823,113 B1 | 10/2010 | Waller et al. | |
| 8,010,929 B2 | 8/2011 | Malhotra et al. | |
| 8,099,700 B1 | 1/2012 | Waller et al. | |
| 8,099,702 B2 | 1/2012 | Hou et al. | |
| 8,151,232 B2 | 4/2012 | Huang et al. | |
| 8,201,127 B1 | 6/2012 | Wang et al. | |
| 8,271,929 B2 | 9/2012 | Laub | |
| 8,332,793 B2 | 12/2012 | Bose | |
| 8,402,414 B2 | 3/2013 | Tanisho et al. | |
| 8,458,639 B2 | 6/2013 | Pandey et al. | |
| 8,479,139 B1 | 7/2013 | Baldsdon et al. | |
| 8,479,141 B1 | 7/2013 | Waller et al. | |
| 8,516,159 B2 | 8/2013 | Ananthanarayanan et al. | |
| 8,538,964 B2 | 9/2013 | Maqdy et al. | |
| 8,683,417 B2 | 3/2014 | Chang et al. | |
| 8,782,588 B2 | 7/2014 | Chang et al. | |
| 2001/0009031 A1* | 7/2001 | Nitta | G06F 17/5077 716/129 |
| 2003/0018947 A1 | 1/2003 | Teiq et al. | |
| 2004/0243964 A1* | 12/2004 | McElvain | G06F 17/5031 716/112 |
| 2006/0080632 A1 | 4/2006 | Ng et al. | |
| 2006/0206848 A1 | 9/2006 | Teig et al. | |
| 2006/0288323 A1 | 12/2006 | Birch | |
| 2007/0028201 A1* | 2/2007 | Mehrotra | G06F 17/5077 716/129 |
| 2007/0220473 A1* | 9/2007 | Goto | G06F 17/5068 716/113 |
| 2008/0005711 A1 | 1/2008 | Scheffer | |
| 2008/0216040 A1 | 9/2008 | Furnish et al. | |
| 2008/0256380 A1 | 10/2008 | Tsutsumi et al. | |
| 2009/0217225 A1 | 8/2009 | Sunder et al. | |
| 2009/0254874 A1* | 10/2009 | Bose | G06F 17/5068 716/113 |
| 2009/0327989 A1 | 12/2009 | Zhuoxiang | |
| 2011/0209112 A1 | 8/2011 | Laub | |
| 2012/0137264 A1 | 5/2012 | Chanq et al. | |
| 2012/0137265 A1 | 5/2012 | Chang et al. | |
| 2012/0297354 A1 | 11/2012 | Scheffer | |
| 2013/0135811 A1 | 5/2013 | Dunwoody et al. | |
| 2013/0268905 A1 | 10/2013 | Pandey et al. | |
| 2014/0033157 A1 | 1/2014 | Chanq et al. | |
| 2014/0033158 A1 | 1/2014 | Chang et al. | |

OTHER PUBLICATIONS

C. Y. Lee, "An Algorithm for Path Connections and Its Applications," IRE Transactions on Electronic Computers, pp. 346-365, 1961.

Charles J. Alpert, Gustavo E. Tellez. "The Importance of Routing Congestion Analysis," DAC, 2010, 14 pages.

D. Z. Pan, P. Yu, M. Cho, A. Ramalingam, K. Kim, A. Rajaram, and S. X. Shi. "Design for Manufacturing Meets Advanced Process Control: A Survey," Journal of Process Control, vol. 18, No. 10, pp. 975-984, 2008.

Danny Rittman. "Nanometer DFM—The Tip of the Ice," http://www.tayden.com/publications/Nanometer%20DFM.pdf, 18 pages.

Dirk Muller. "Optimizing Yield in Global Routing," ICCAD, pp. 480-486, 2006.

E. Papadopoulou and D. T. Lee. "Critical Area Computation via Voronoi Diagrams," IEEE Trans. on Computer-Aided Design of Integrated Circuits and Systems, vol. 18, No. 4, pp. 463-474, 1999.

Fong-Yuan Chang, Ren-Song Tsay and Wai-Kei Mak, "How to Consider Shorts and Guarantee Yield Rate Improvement for Redundant Wire Insertion," ICCAD, pp. 33-38, 2009.

Fong-Yuan Chang, Ren-Song Tsay, Wai-Kei Mak and Sheng-Hsiung Chen, "A Separation and Minimum Wire Length Constrained Maze Routing Algorithm Under Nanometer Wiring Rules," in ASP-DAC Jan. 23, 2013, pp. 175-180.

Fong-Yuan Chang, Ren-Song Tsay, Wai-Kei Mak and Sheng-Hsiung Chen, "MANA: A Shortest Path Maze Algorithm under Separation and Minimum Length Nanometer Rules," IEEE Transactions on Computer-Aided Design of Integrated Circuits and Systems. vol. 32, Issue: 10, Oct. 2013, pp. 1557-1568.

J. Mitra, P. Yu, and D. Z. Pan. "RADAR: RET-Aware Detailed Routing Using Fast Lithography Simulations," DAC, pp. 369-372, 2005.

L. Huang and D.F. Wong. "Optical Proximity Correction (OPC)-Friendly Maze Routing," DAC, pp. 186-191, 2004.

M. Cho, D. Z. Pan, H. Xiang, and R. Puri. "Wire Density Driven Global Routing for CMP Variation and Timing," ICCAD, pp. 487-492, 2006.

M. Cho, J. Mitra, and D. Z. Pan. "TROY: Track Router with Yield-Driven Wire Planning," DAC, pp. 55-58, 2007.

M. Cho, J. Mitra, and D. Z. Pan. "Manufacturability-Aware Routing," in: Handbook of Algorithms for VLSI Physical Design Automation, CRC Press, 2009.

Mo et al., "Fishbone: A Block-Level Placement and Routing Scheme", ISPD '03: Proceedings of the 2003 International Symposium on Physical Design, Publisher ACM, Apr. 2003, 6 pgs.

Non-Final Office Action for U.S. Appl. No. 13/289,965 dated Mar. 28, 2014, 11 pages.

Non-Final Office Action for U.S. Appl. No. 13/289,963, dated Nov. 9, 2012, 8 pages.

Non-Final Office Action for U.S. Appl. No. 13/289,965, dated Nov. 30, 2012, 10 pages.

Non-Final Office Action for U.S. Appl. No. 14/043,619, dated Nov. 7, 2013, 9 pages.

Non-Final Office Action for U.S. Appl. No. 14/043,689, dated May 27, 2014, 12 pages.

Notice of Allowance for U.S. Appl. No. 13/289,963, dated Apr. 18, 2013, 6 pages.

Notice of Allowance for U.S. Appl. No. 13/289,963, dated Jun. 12, 2013, 6 pages.

Notice of Allowance for U.S. Appl. No. 13/289,963, dated Nov. 20, 2013, 7 pages.

Notice of Allowance for U.S. Appl. No. 13/289,965, dated Jun. 10, 2013, 8 pages.

Notice of Allowance for U.S. Appl. No. 13/289,965, dated Oct. 3, 2014, 10 pages.

Notice of Allowance for U.S. Appl. No. 14/043,619 dated Mar. 6, 2014, 9 pages.

P. E. Hart, N. J. Nilsson and B. Raphael, "A Formal Basis for the Heuristic Determination of Minimum Cost Paths," IEEE Trans. on Systems Science and Cybernetics, No. 4, pp. 100-107, 1968.

S. R. Nassif and K. J. Nowka. "Physical Design Challenges Beyond the 22 nm Node," ISPD, pp. 13-14, 2010.

Zhang et al., "GDRouter: Interleaved Global Routing and Detailed Routing for Ultimate Routability", DAC '12, Proceedings of the 49th Annual Design Automation Conference, Publisher ACM, Jun. 2012, 6 pgs, pp. 597-602.

* cited by examiner

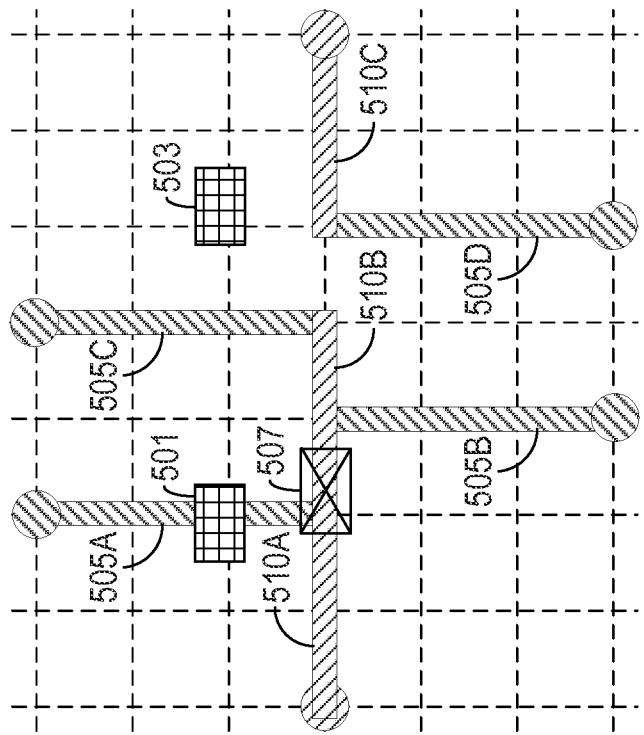
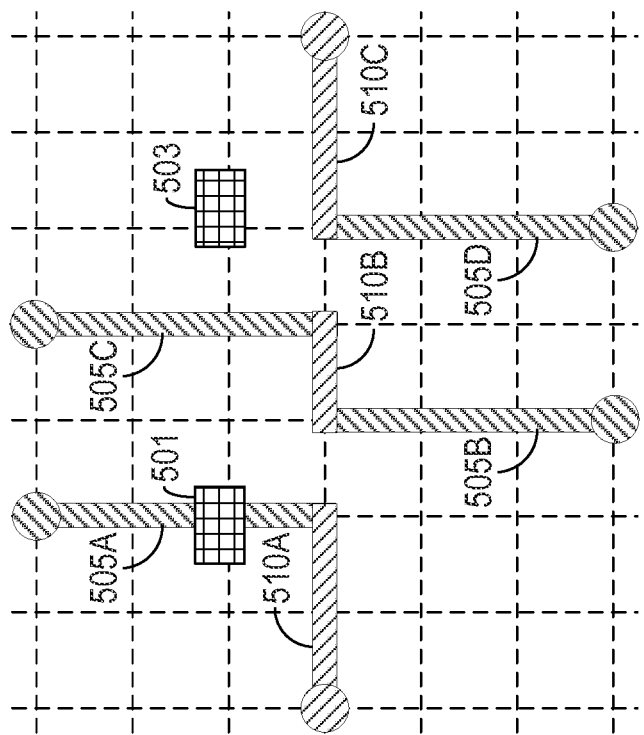

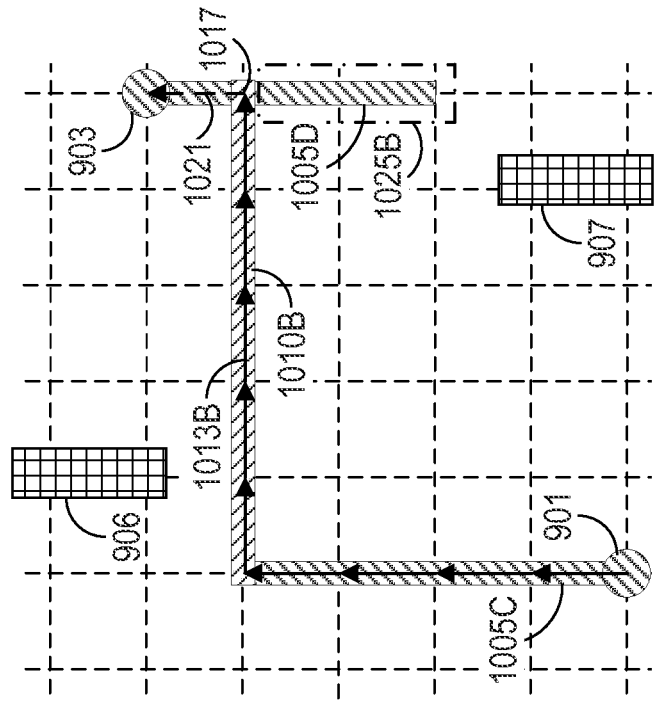
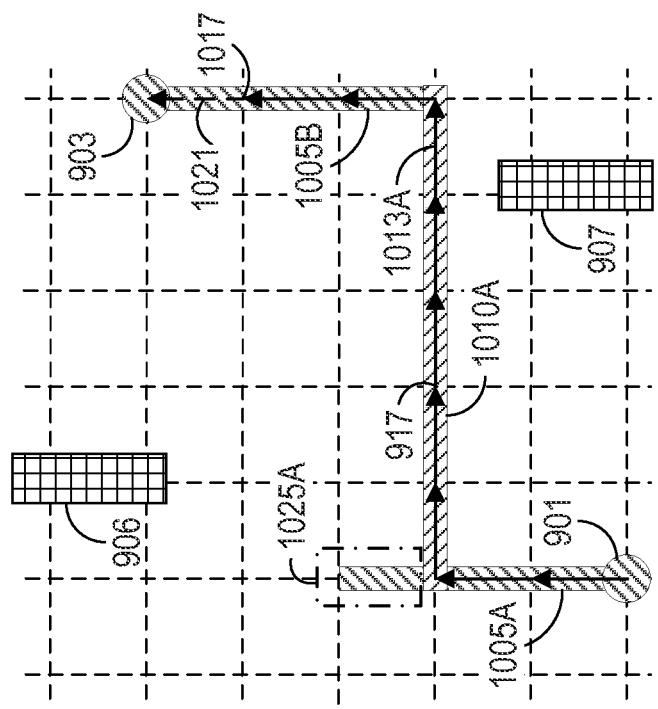

SEPARATION AND MINIMUM WIRE LENGTH CONSTRAINED MAZE ROUTING METHOD AND SYSTEM

CROSS-REFERENCES TO RELATED APPLICATIONS

This application claims priority, under 34 U.S.C. § 119(e), from U.S. Provisional Application No. 61/882,499, filed on Sep. 25, 2013, entitled "SEPARATION AND MINIMUM WIRE LENGTH CONSTRAINED MAZE ROUTING METHOD AND SYSTEM", the contents of all of which is incorporated herein by reference in its entirety.

BACKGROUND

The present invention relates generally to a method and system for computer aided design (CAD) of integrated circuits and in particular to finding a shortest way for routing a path.

Wires are typically layers of conductive metal material such as copper or aluminum that are separated by layers of insulating material such as silicon dioxide. The metal layers are patterned using photolithographic techniques to form the wires for interconnecting the electrical elements in an integrated circuit (IC). The design or layout of a complex IC may, in part, be automated such that the location of interconnection wires, hereinafter also referred to as "wires," is determined with the aid of CAD software called a router. Nanometer physical design is facing increasing challenges from process limitations, such as lithography printability, topology variation, random defects, and the like. Since many process limitations are interconnection-related, the routing step is considered important to address these challenges.

In general, routing methods to handle process limitations are categorized into the model-based and rule-based approaches. The model-based approach is to design models to capture manufacturing effects, which is used to guide routers for layout optimization. Conversely, the rule-based approaches translate process limits into design rules to be followed by routers.

Many model-based approaches have been proposed including a predictive copper chemical-mechanical planarization model, used in a global router to minimize topology variations, a model using random defects as critical areas, and other related critical area minimization methods. Additionally, an effective redundant wire insertion algorithm has been proposed to tolerate potential wire opens. Lithography diffractions are also addressed in some models. Yet, to minimize the impact on routing runtime, the above proposed models are simplified and the modeling accuracy may be compromised.

In contrast to model-based approaches, only a few rule-based approaches have been published. In nanometer technology nodes, foundries impose numerous wiring design rules, hereinafter also referred to as "wiring rules" or "rules" on chip layout. Yet, these rules can incapacitate existing routing algorithms and lengthen the computer run time to route the IC, i.e. effect the ability of the computer to route paths.

Thus there is a need for a better router that provides short computer run times and short routing paths that are legal by design rules.

SUMMARY

According to one embodiment of the present invention, a computer implemented method for routing a first path in a circuit design is presented. The method includes iteratively building, using the computer, a multitude of partial-paths to route the first path by adding an incremental length to a selected previously built partial-path when the computer is invoked to route the first path in the circuit design, the adding being performed in accordance with at least a first design rule.

According to one embodiment, the multitude of partial-paths start at a first location. The method further includes comparing, using the computer, each of the multitude of partial-paths to each other when the multitude of partial-paths end on a common second location different from the first location, and saving, using the computer, one of the multitude of partial-paths that leads to a shortest first path. The method further includes eliminating, using the computer, one of the multitude of partial-paths that are not selected to lead to the shortest first path.

According to one embodiment, the first design rule is associated with a spacing of the incremental length to a second path. According to one embodiment, each of the multitude of partial-paths is a continuous electrical conductor that is unbroken by passive or active components.

According to one embodiment, the multitude of partial-paths start at a first location. The incremental length is added to a first end of the selected previously built partial-path, the first end being located opposite a second end adjacent the first location.

According to one embodiment, the method further includes repeating the iterative building to find the first path when a stop criterion is not met. The stop criteria is not met when the selected previously built partial-path does not overlap a target location or the length of the selected previously built partial-path that overlaps the target location is longer than the length of any other one of the multitude of partial-paths.

According to one embodiment, the method further includes repeating the iterative building to find the first path when a stop criteria is not met. The stop criterion is not met when the selected previously built partial-path does not overlap a target location or at least one of the multitude of partial-paths in a queue does not include the incremental length.

According to one embodiment, the method further includes extending, using the computer, the length of a portion of one of the multitude of partial-paths thereby forming an extended partial-path when the portion violates a second design rule different from the first design rule.

According to one embodiment, the portion is built from a continuous conductive line on a single conductive layer. According to one embodiment, the second design rule is associated with a minimum length of the portion. According to one embodiment, the method further includes saving, using the computer, the extended partial-path when the extended partial-path does not violate a third design rule different than the first and second design rules.

According to one embodiment, the multitude of partial-paths start at a first location. The method further includes saving, using the computer, a first length and a second length associated with each of a different one of the multitude of partial-paths. The method further includes determining, using the computer, one of the multitude of partial-paths that leads to a shortest first path when the multitude of partial-paths end on a common second location different from the first location, the determining being in accordance with the saved first length and second length.

According to one embodiment, the method further includes saving, using the computer, one of the multitude of partial-paths that leads to a shortest first path, and eliminating, using the computer, one of the multitude of partial-paths that are not selected to lead to the shortest first path.

According to one embodiment, the selected previously built partial-path plus the added incremental length form an expanded partial-path. The method further includes eliminating either the expanded partial-path or the selected previously built partial-path when the first length of the expanded partial-path is equal to the first length of the selected previously built partial-path and when the second length of the expanded partial-path is equal to the second length of the selected previously built partial-path.

According to one embodiment, the selected previously built partial-path plus the added incremental length form an expanded partial-path. The method further includes eliminating the selected previously built partial-path when the first length of the selected previously built partial-path is longer than or equal to the second length of the expanded partial-path.

According to one embodiment, the selected previously built partial-path plus the added incremental length form an expanded partial-path. The method further includes eliminating the expanded partial-path when the first length of the expanded partial-path is longer than or equal to the second length of the selected previously built partial-path.

According to one embodiment, the first length does not include a length associated with a portion of the expanded partial-path that is expanded so as not to violate a second design rule different from the first design rule. According to one embodiment, the second length includes a length associated with a portion of the selected previously built partial-path that is expanded so as not to violate a second design rule different from the first design rule.

According to one embodiment of the present invention, a method for routing a first path in a circuit design includes iteratively building a multitude of partial-paths to route the first path by adding an incremental length to a selected previously built partial-path when a computer is invoked to route the first path in the circuit design, the adding being performed in accordance with at least a first design rule. The first path defines a conductor of an integrated circuit represented by the circuit design when the integrated circuit is fabricated.

A better understanding of the nature and advantages of the embodiments of the present invention may be gained with reference to the following detailed description and the accompanying drawings.

BRIEF DESCRIPTION OF THE DRAWINGS

FIG. 5A-5D depict a simplified example of a path produced by a traditional maze routing that does not consider the minimum wire length rule during routing.

FIG. 5A depicts an example path routing without considering the minimum wire length rule.

FIG. 5B depicts the example path routing depicted in FIG. 5A after extending short wires to meet the minimum wire length rule.

FIG. 5C depicts the example path routing depicted in FIG. 5A after removing paths with violations and filtering out violated grid points.

FIG. 5D depicts the example path routing depicted in FIG. 5C after re-routing the open net and extending short wires to meet the minimum wire length rule.

FIG. 6A depicts an initial wire increment of an expanded partial-path starting from a source point, in accordance with one embodiment of the present invention.

FIG. 6B depicts an exemplar full path that requires extensions be added to the wire increment depicted in FIG. 6A, in accordance with one embodiment of the present invention.

FIG. 6C depicts an exemplar full path that requires no extensions added to the wire increment depicted in FIG. 6A, in accordance with one embodiment of the present invention.

FIG. 10A depicts a first example of a nearly complete partial-path by further expanding the same partial-path depicted in FIG. 9, in accordance with one embodiment of the present invention.

FIG. 10B depicts a second example of a nearly complete partial-path using the same blockages and source/target points as depicted in FIG. 9, in accordance with one embodiment of the present invention.

DETAILED DESCRIPTION

According to embodiments of the present invention, a separation and minimum wire length constrained maze router, which is able to find a legal shortest path under wiring rules and improve the wiring quality with reduced run time, is presented. The embodiments described below reduced the runtime by 2.4 times and reduced total wire length by 3% on average.

Figure 1:
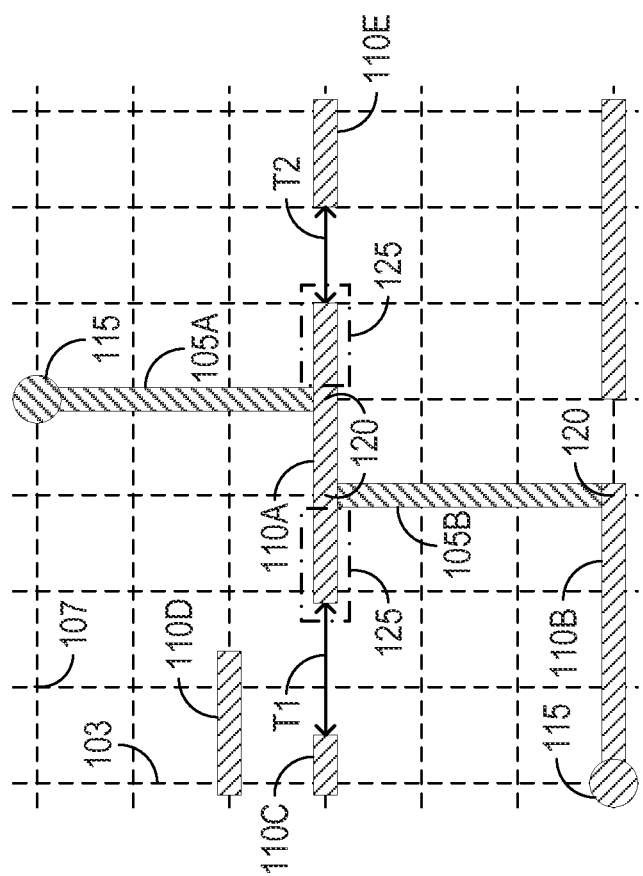
FIG. 1 depicts a simplified example of wire separation and length.

The following examples provide a brief introduction to wire routing under nanometer design rules. FIG. 1 depicts a simplified example of nanometer wiring rules specifying the required separation between two wire ends and the minimum length of a wire segment. The example of nanometer wiring rules includes a patterned metal one layer 105, hereinafter also referred to as "M1," and a patterned metal two layer 110, hereinafter also referred to as "M2," which are vertical and horizontal routing layers, respectively. Similar fill code patterns denote the same metal layer. It is understood that M1 has been assigned as a vertical routing layer by way of example and could, alternatively, be assigned as a horizontal routing layer. Adjacent metal layers such as M1 and M2 are commonly assigned to orthogonal routing layers. Although the figures show just two metal layers by way of example, the embodiments of the present invention may be applicable to an arbitrary number of wire layers.

Potential locations for wires are in predetermined tracks separated by a spacing specified by design rules. The spacing between the longitudinal centerlines of adjacent tracks on the same layer is called a pitch. Although, by way of example, the figures show similar spacing for M1 and M2, depicted by a regular grid 103 of dotted lines corresponding to the longitudinal centerline of the tracks, the embodiments of the present invention may be applicable to different spacing associated to different metal layers. In other words, the pitch of M1 may or may not be equal to the pitch of M2. The grid may include locations 107 at the intersections of adjacent interconnect layers, i.e. where the vertical and horizontal dashed lines intersect, that are called grid points 107, hereinafter also referred to as a "points".

There may be electrically conductive vias connecting different metal layers, for example at an intersection of a M1 wire and M2 wire such as at locations 120 to complete the electrical continuity of the path between source or target points 115. However, for better clarity, the conductive vias are not shown in the figures but are understood to be present. A circle 115 symbolically denotes source or target points, which are the end points of a path. A path, hereinafter also referred to as a "net," includes any combination of electrically connected wire segments such as 105A, 110A, 105B, and 110B that electrically connect source and target points 115 using only wires or vias to make the connection.

A minimum increment of wire length may be equal to a single pitch. A continuous stretch of wire in the same track of a single electrical conductor layer is called a wire segment, hereinafter also referred to as a "segment". A wire segment may include a multiple of wire increments, each increment equal to a pitch in length. A path may include one or more segments on one or more interconnect layers. Thus, the total length of a path may be given by the number of pitches the path includes for each segment on every interconnect layer directly connected to that path. For example, the total wire length of the path between source or target points 115 is 12 pitches long.

Paths may also include patterned polysilicon or single-crystal-diffusion wire segments that are commonly overlaid with a refractory metal layer to reduce resistivity. In other words, a net or path is a continuous electrical connection of electrically conductive wires and possibly vias, formed of materials such as one or more layers of patterned metals, that is unbroken by any other passive or active components such as resistors, capacitors, transistors, or the like. Such net or path is typically represented as a wire, i.e. a continuous single line, on a schematic representation of a circuit. For example, a resistor may have a resistivity per unit length that is at least an order of magnitude higher than that of a path increment. In another example, one of the terminals of a transistor may not break a single path such that the same path restarts at another terminal of that transistor—then there are two separate paths. However, it is understood that paths may have distributed electrical attributes such as parasitic resistance and capacitance, which are usually undesired and become larger for longer paths. Thus, routing a path with the shortest length is more desirable than a longer path.

The required separation between wire ends may depend on the position of surrounding wires. For example, the required separation between two wire ends of wire segments 110A, 110C is T1 if there is a wire 110D on a neighboring track adjacent to one of the wire ends. Otherwise, when there is no adjacent wire, the required separation is T2, as depicted between the wire ends of wire segments 110A, 110E. The design rules may require T1 to be larger than T2, because T2 does not have adjacent wires that make printing narrow spaces more difficult.

Figure 2:
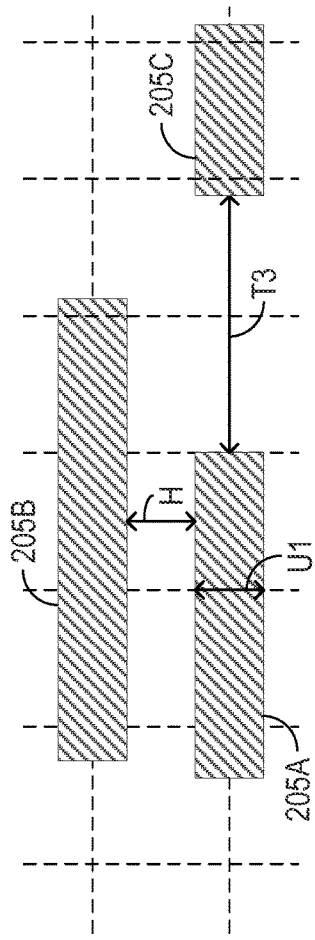
FIG. 2 depicts a simplified example of one wire end-end separation related design rule.

There may be a multitude of wiring rules related to the separation between two wire ends, hereinafter also referred to as the "end-end separation." FIG. 2 depicts a simplified example of one wire end-end separation related design rule. In practice, width U1 of a metal one wire 205A is smaller than U1' and separation H between two parallel wire segments 205A, 205B on neighboring tracks is smaller than H', where U1', H' and T' are predetermined constants. The rule may state that if U1<U1', and H<H', then the distance T3 between wire segments 205A, 205C should be larger than T', i.e. T' is the minimum end-end separation. There may be many other similar wiring rules to specify the required end-end separation for different adjacent wire examples.

Figure 3:
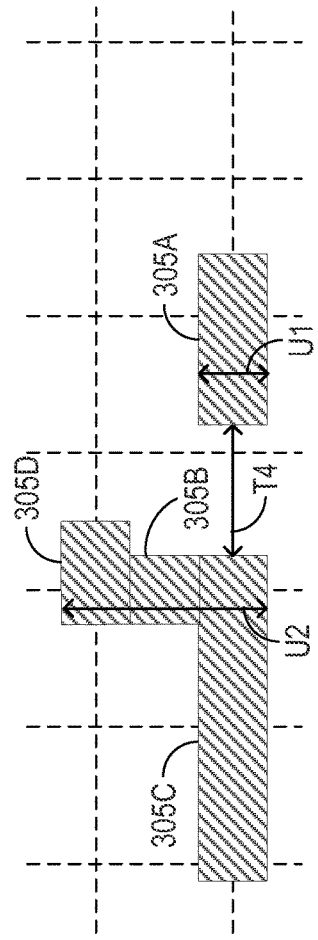
FIG. 3 depicts a simplified example of another wire end-end separation related design rule.

FIG. 3 depicts a simplified example of another wire end-end separation related design rule, which specifies the required end-end separation with a different combination of surrounding wire segments. In practice, width U1 of a metal one wire 305A is smaller than U1' and width U2 of the combined metal one wire segments 305B, 305C, 305D, where wire segment 305B joins the ends of offset wire segments 305C, 305D, is smaller than U2', where U1', U2' and T" are predetermined constants. The rule may state that if U1<U1', and U2<U2', then the distance T4 between wire segments 305A, 305C should be larger than T", i.e. T" is the minimum end-end separation.

Referring again to FIG. 1, the required final minimum length of a wire segment may be constrained by the design rules. One typical rule is to specify the minimum required area of a metal shape. In routing, usually the width of a wire is fixed by a predetermined amount and only the length can be adjusted as a variable. Thus to meet the rule, the length of a wire segment needs to be longer than a minimum wire length, called the minimum wire length rule. For example, the minimum wire length may be three pitches long. If the only constraint were to make electrical continuity for the path between source or target points 115, the wire segment 110A would only need to extend the length of about one pitch between wire segments 105A, 105B. However, to meet the required minimum wire length constraint, wire segment 110A is extended at the locations enclosed by the two dotted and dashed rectangles 125, which lengthens the path length from 10 pitches to 12 pitches. Wire increments that are added because of the minimum wire length rule, such as those depicted inside rectangles 125, are called extensions, hereinafter also referred to as extended wires.

Paths found by traditional maze algorithms may violate the required separation between wire ends rules or are not shortest after extending short wires to meet the required minimum length design rule. Note that in current nanometer processes, the required minimum wire length is longer than one pitch and the maximum required end-end separation, i.e. T1, is also longer than one pitch. Without considering these rules in traditional maze routing, wire ends may be improperly generated on any grid points. Thus, in a resulting traditionally generated path, the end-end separation and the wire length may be shorter than the required lengths, creating design rule violations. In addition, after extending short wires, usually the total length of wires in a resulting traditionally generated path is not the shortest length, resulting in higher parasitic resistance and/or capacitance, which in-turn produces lower circuit performance. Worse, there may be no room to extend short wires or increase short separations to fix design rules; or, after extending short wires or increasing separations to fix design rule violations, and new design rule violations may be created in other places using the traditional maze routing.

Figure 4C:
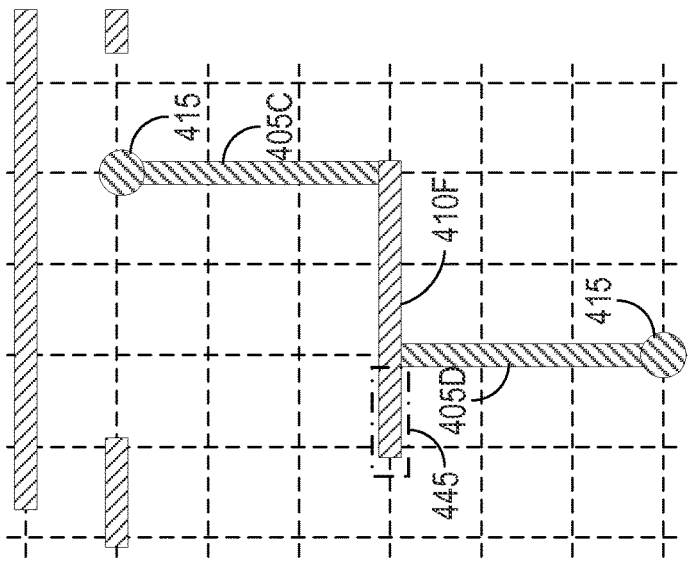
FIG. 4C depicts a simplified example of a path produced by a maze routing that results in a shortest path without design rule violations, in accordance with one embodiment of the present invention.
Figure 4B:
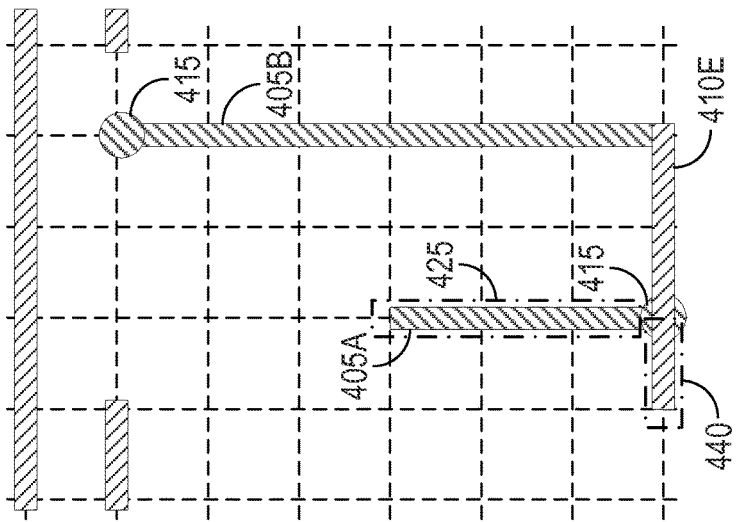
FIG. 4B depicts a simplified example of a path produced by a traditional maze routing that results in not the shortest path.
Figure 4A:
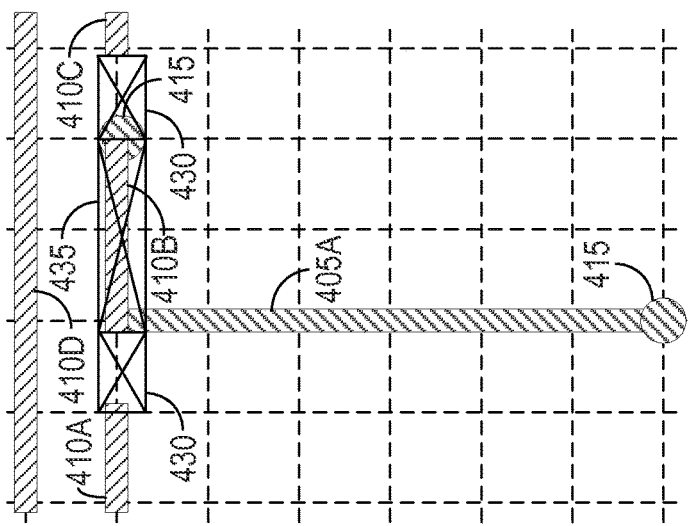
FIG. 4A depicts a simplified example of a path produced by a traditional maze routing that results in design rule violations.

FIG. 4A depicts a simplified example of a path produced by a traditional maze routing that results in design rule violations. The path between M1 source or target points 415 includes M1 wire segment 405A and M2 wire segment 410B. However this traditionally generated path contains two end-end separation violations identified by a rectangle enclosing a cross 430 at two locations—one violation between M2 wire segments 410A, 410B, the other violation between M2 wire segments 410B, 410C. These two end-end separation violations occur because M2 wire segment 410D is in a track immediately adjacent the track including M2 wire segments 410A-410C so the end-end separations should each be at least two pitches long to be design rule compliant or legal in this example. Further, the horizontal M2 wire segment 410B, which is only two pitches long, cannot be extended to meet the required three pitch minimum length design rule because doing so would short wire segments 410B to adjacent wire segments 410A, 410C in the same track but belonging to other paths, i.e. other electrical circuit nodes. This minimum wire length violation is identified by a rectangle enclosing a cross 435. The path is therefore not legal by design rules and would have to be removed and re-routed.

FIG. 4B depicts a simplified example of a path produced by a traditional maze routing that results in not the shortest path. The path includes M1 wire segments 405A, 405B, and M2 wire segment 410E. The lower one of the M1 source or target points 415 in FIG. 4B counts as a M1 area that should be extended by three pitches to meet the minimum length design rule as depicted by M1 wire segment 405A, which is enclosed within a dotted and dashed rectangle 425. Further, M2 wire segment 410E should be extended by one pitch in the portion of wire segment 410E enclosed by a dotted and dashed rectangle 440. Although no violation exists, after extension of the required wire segments, the total length of all wires in the path increases from eight pitches to twelve pitches. Longer paths are undesirable due to the larger area they consume on the surface of the IC and the added parasitic capacitance, which increases circuit delays.

FIG. 4C depicts a simplified example of a path produced by a maze routing that results in a shortest path without design rule violations, in accordance with one embodiment of the present invention. The path includes M1 wire segments 405C, 405D and M2 wire segment 410F. A portion of M2 wire segment 410F, which is enclosed within a dotted and dashed rectangle 445, is extended by one pitch to meet the minimum length design rule of three pitches. The resulting path is nine pitches in total length, which is three pitches shorter than that of the legal path depicted in FIG. 4B, which was generated by a traditional routing algorithm. Thus, the new constrained maze router finds a legal shortest path under the wiring design rules.

Certain parts of a routing track may be blocked by wire segments placed in predetermined locations associated with IC components that are fixed in position on the grid by a separate placement module executed before routing or placed simultaneously during routing. The blockages on an interconnect layer form a "maze" that the router will avoid or route around the blockage when routing that interconnect layer.

Figure 5D:
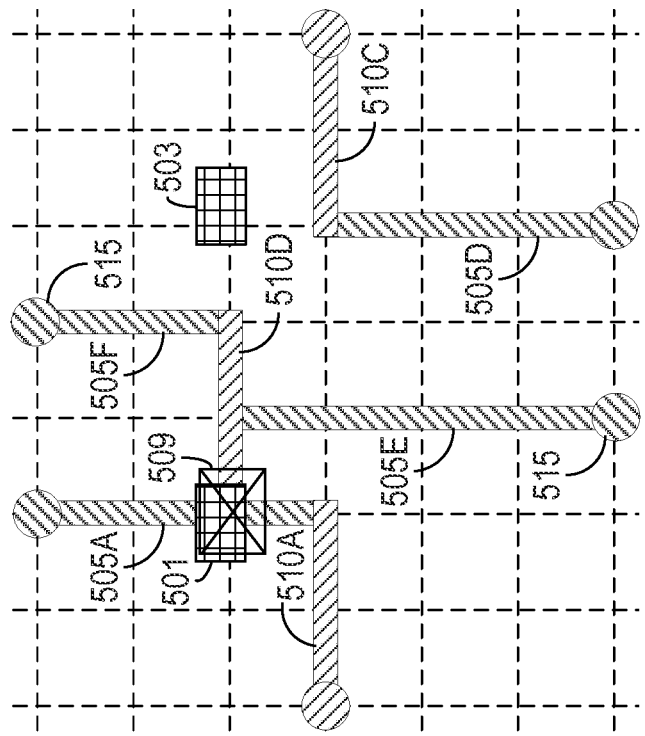

It can be shown that if the minimum wire length rules are not considered during maze routing, the computer's ability to route paths is seriously impacted. FIG. 5A-5D depict a simplified example of a path produced by a traditional maze routing that does not consider the minimum wire length rule during routing. FIG. 5A depicts an example path routing without considering the minimum wire length rule. Two M2 blockages 501, 503 are included in the maze forcing the routing of M2 wire segments 510A, 510B, 510C to avoid the blocked M2 track locations. The maze routing generates some paths containing short wires. If the minimum wire length rule is not considered during maze routing, minimum wire length rule violations must be fixed by post-processing after the initial routing. In this example, the minimum wire length rule is two pitches. Although M1 wire segments 505A-505D, and M2 wire segments 510A, 510C meet the minimum wire length rule, M2 wire segment 510B does not.

FIG. 5B depicts the example path routing depicted in FIG. 5A after extending short wires to meet the minimum wire length rule. The space nearby short wires may be insufficient to accommodate the wire extensions. As a result, rule violations occur after extending short wires. For example, M2 wire segment 510B is extended by one pitch but causes a short to another path depicted as violation 507.

Figure 5C:
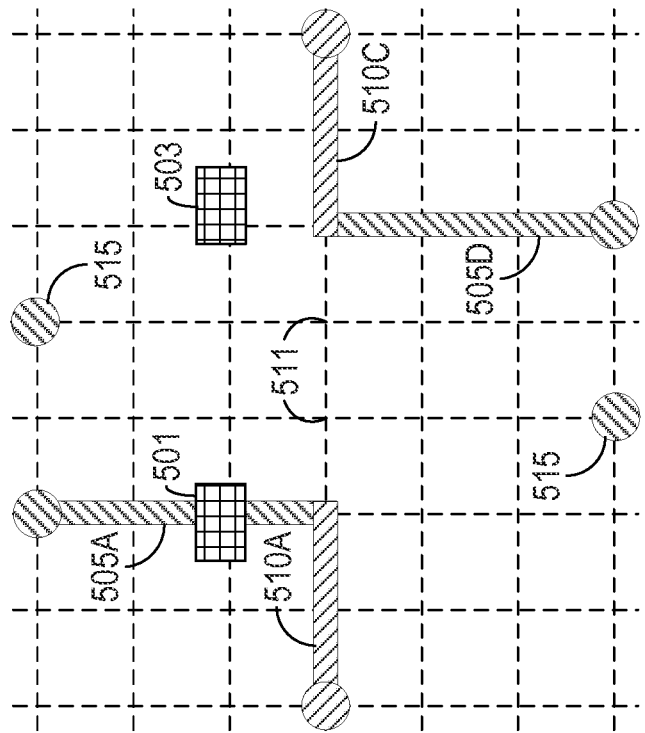

FIG. 5C depicts the example path routing depicted in FIG. 5A after removing paths with violations and filtering out violated grid points. For example, because the path including M1 wire segments 505B, 505C and M2 wire segment 510B had a violation after extending M2 wire segment 510B, all three wire segments 505B, 505C, 510B are removed, leaving the net between source or target points 515 open. The two grid points 511 are filtered-out because they were associated with design rule violations.

FIG. 5D depicts the example path routing depicted in FIG. 5C after re-routing the open nets and extending short wires to meet the minimum wire length rule. The re-routed path between source or target points 515 includes M1 wire segments 505E, 505F and M2 wire segment 510D. However, without considering the minimum wire length rule during maze routing, rule violation may occur over again. Thus, the rule may be violated iteratively, leading to no solutions or much iteration to resolve violations. Consequently, the computer's ability to route the path suffers, i.e. computer run time increases.

According to an embodiment of the present invention, a constrained maze router, hereinafter also referred to as the "router", iteratively builds a multitude of partial-paths by adding an increment, e.g. a single-pitch length to a selected previously built partial-path during each iteration. The increment is added in accordance with design rules, i.e. a legally expanded partial-path, which greatly reduces design rule violations before post-processing. Expanded partial-paths that end on the same grid point are compared against each other and the partial-path leading to a longer final path is eliminated. Thus, by eliminating longer and redundant partial-paths, the time complexity of the new router is polynomial, the same as that of a traditional maze routing algorithm, i.e. O(n) where n is the number of grid points. The iteration of the router ends when a shortest legal path is found. The router finds a legal shortest path under wiring rules related to the end-end separation and the minimum wire length rules. Each expanded partial-path that is saved includes two types of length values that are used to determine the shortest path. The two types of length values are related to the minimum wire-length design-rule as explained below.

Figure 6C:
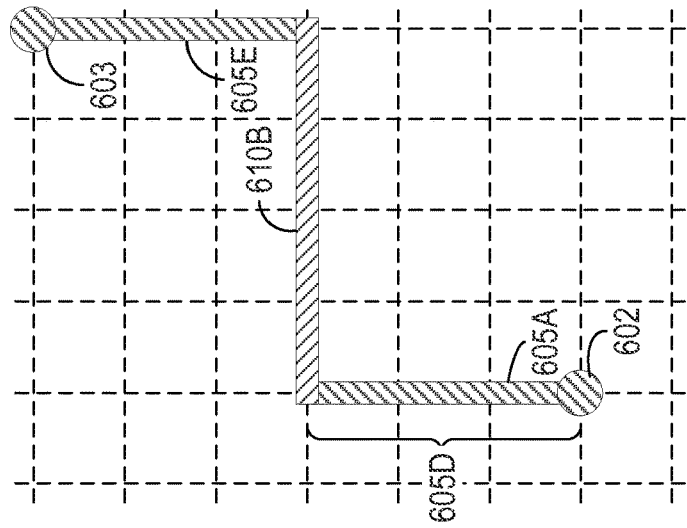
FIG. 6A-6C depict exemplar effects of extensions on the length of a partial-path, in accordance with one embodiment of the present invention.
Figure 6B:
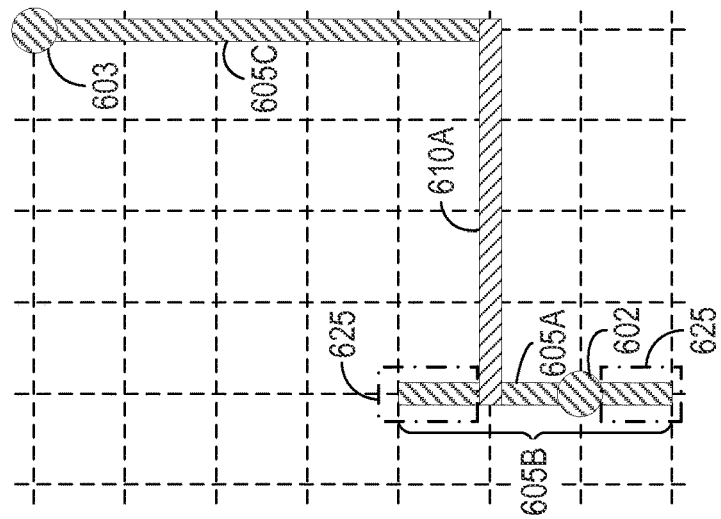
Figure 6A:
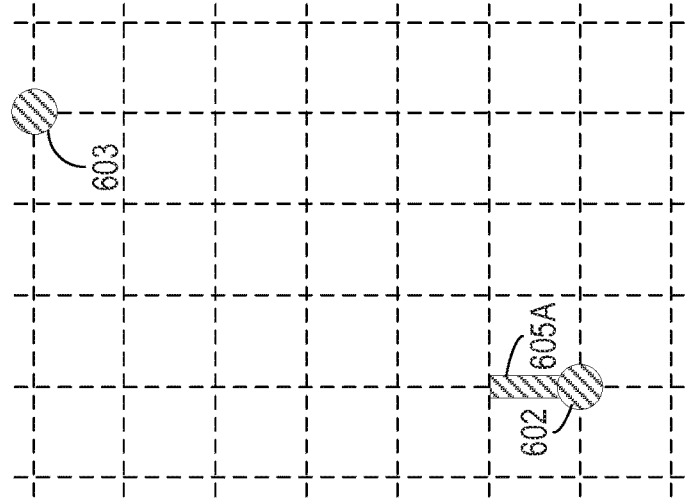

FIG. 6A-6C depict exemplar effects of extensions on the length of a partial-path, in accordance with one embodiment of the present invention. Because the constrained maze router iteratively builds wire segments an increment at a time, the final length of a wire segment is unknown until future iterations of the router. That wire segment length uncertainty at a non-final iteration of the router is due to not knowing if an extension to meet the minimum wire-length design-rule is required or not until the router decides a new route direction is required or the target point is reached, i.e. when a wire segment is completed.

FIG. 6A depicts an exemplar initial wire increment of an expanded partial-path starting from a M1 source point 602 at an intermediate step of the constrained maze router, in accordance with one embodiment of the present invention. During the first iteration, the router connects a M1 wire increment 605A to M1 source point 602. In other words, M1 source point 602 has been expanded by one pitch. However, the final length of the M1 wire segment containing M1 wire increment 605A is still undetermined.

FIG. 6B depicts an exemplar full path connecting M1 source point 602 to M1 target point 603 that requires M1 extensions be added to wire increment 605A depicted in FIG. 6A and enclosed in dotted and dashed rectangles 625 depicted in FIG. 6B, in accordance with one embodiment of the present invention. The extensions are added because the minimum wire-length design-rule is three pitches in this example and because the router later incrementally built a M2 wire segment 610A connecting to M1 wire increment 605A only one pitch away from M1 source point 602. Thus, the extensions were necessary to prevent the single pitch length of M1 wire increment 605A depicted in FIG. 6A from violating the minimum wire length design rule. The final path depicted in FIG. 6B, which includes extended M1 wire segment 605B, M2 wire segment 610A, and M1 wire segment 605C has a total length of 12 pitches.

FIG. 6C depicts an exemplar full path that includes M1 wire segment 605D, M2 wire segment 610B, and M1 wire segment 605E that requires no extensions added to the wire increment 605A depicted in FIG. 6A, in accordance with one embodiment of the present invention. The final path depicted in FIG. 6C has a total length of 10 pitches, 2 pitches shorter than the final path depicted in FIG. 6B because no extensions are required. Thus, the wire length is uncertain until the final path is known due to the requirements of the minimum wire length design rule.

To deal with the wire segment length uncertainty during incremental partial-path construction, the iterative router uses two length definitions for a partial-path, in accordance with one embodiment of the present invention. The "min length", S, of a partial-path from the source is equal to the length of its last incremental wire segment without extensions plus the sum of lengths of all previous wire segments with extensions. In contrast, the "max length", L, of a partial-path from the source is equal to the length of its last incremental wire segment with the longest required extensions plus the sum of lengths of all previous wire segments with extensions. At the end of the routing, max length L is equivalent to the final total path length. These two length definitions for a partial-path will be used during the routing to pick a minimum length path between the source and target points.

Figure 7:
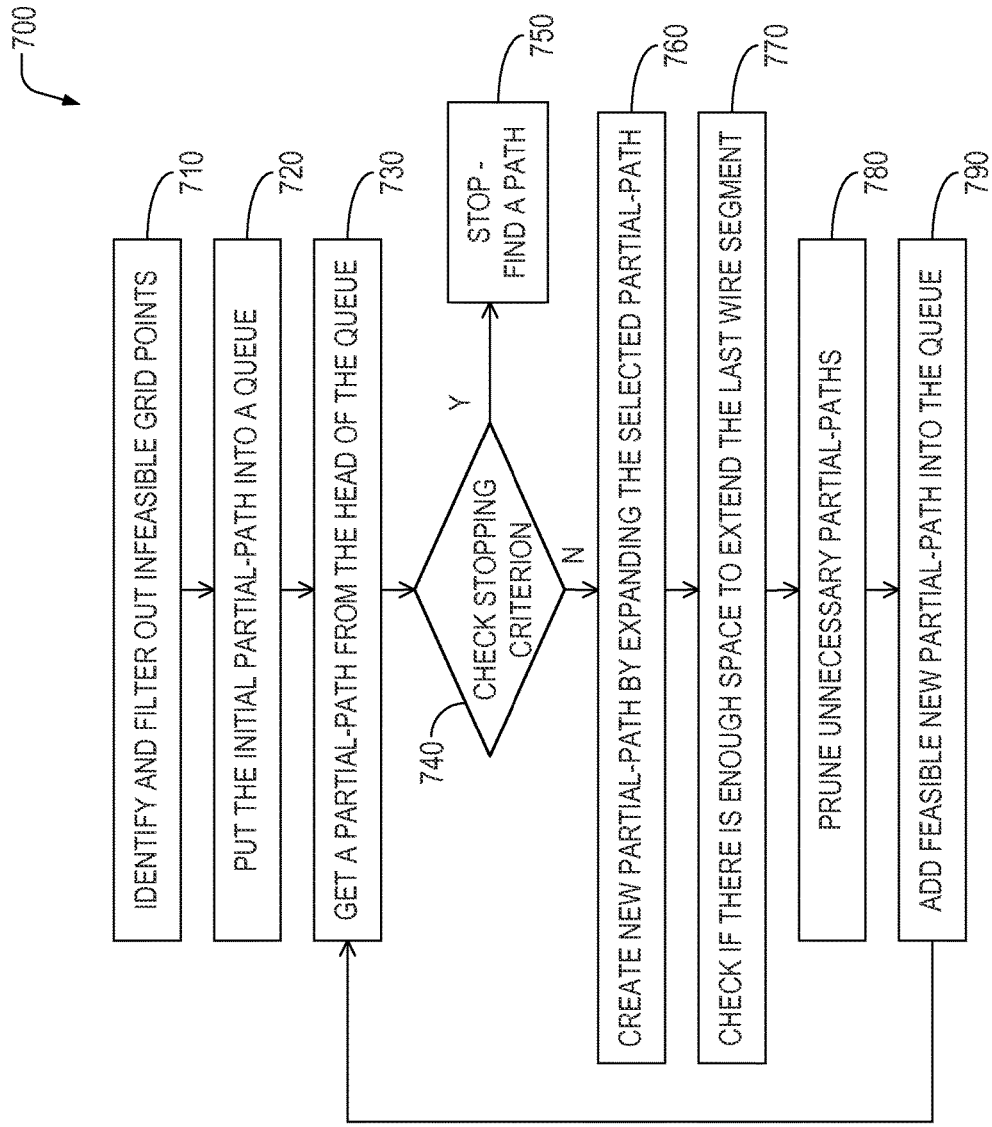
FIG. 7 depicts a simplified flow chart for a constrained maze routing, in accordance with one embodiment of the present invention.

FIG. 7 depicts a simplified flow chart for a constrained maze routing 700, in accordance with one embodiment of the present invention. The router starts by identifying 710 grid points or locations that would violate the end-end separation design rule where a potential path may overlap such points and filtering out or removing such points, called "infeasible" grid points, from consideration as possible grid points available for future path routing.

Figure 8:
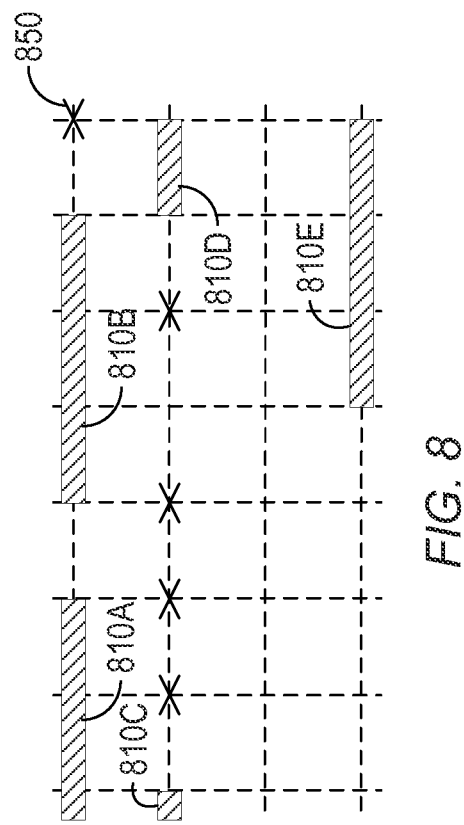
FIG. 8 depicts a simplified exemplar result of identifying and filtering out infeasible grid points, in accordance with one embodiment of the present invention.

FIG. 8 depicts a simplified exemplar result of identifying and filtering out infeasible grid points, in accordance with one embodiment of the present invention and depicts M2 wire segments 810A-810E, which were placed and/or routed before running the router. The router creates a hypothetical wire increment on each grid point for each affected interconnect layer and checks if any end-end separation related design rules are violated and identifies those grid points as "infeasible", as depicted by the multitude of crosses 850. In this example, if there is a wire increment near a wire end on a neighboring track, the required separation between two wire ends is two pitches long. Otherwise, the required separation is one pitch long. Routing a path overlaying infeasible grid points will be avoided during subsequent routing steps. On the other hand, grid points not deemed infeasible will be considered feasible and made available for potential routing of the path by the router.

Referring again to FIG. 7, the router connects an initial increment to the source point to create an initial partial-path, that is, put 720 or save an initial increment into a queue along with the S and L values of the initial partial-path, such as initial partial-path 605A depicted in FIG. 6A. The initial partial-path does not overlap any infeasible grid points when infeasible grid points were identified earlier.

FIG. 7 further depicts steps 730-790, which iteratively build a multitude of partial-paths by increments of one pitch length per iteration starting from the source point, exhaustively searches all legal partial-paths and selectively saves those partial-paths that lead to the shortest legal final path, while discarding redundant and longer partial-paths. The multitude of partial-paths is saved in a queue. The router gets 730 or selects a partial-path from the head of the queue to begin an iteration of the routing. As described above, each partial-path includes two length values, S and L associated with that partial-path.

Next, the router checks 740 or determines a stopping criterion by testing the selected partial-path. The stopping criteria is met if the selected partial-path overlaps the target point, and L of the selected partial-path is no longer than S of any other one of the multitude of partial-paths in the queue. The stopping criteria is not met if the partial-path does not overlap the target point, or L of the selected partial-path that overlaps the target point is longer than S of any other one of the multitude of partial-paths in the queue. If the stopping criterion is met, the router stops 750 and a shortest length legal path is found. If the stopping criteria is not met, the router creates 760 a new partial-path by expanding the selected partial-path, thus forming an expanded partial-path. The stopping criteria is also met if the selected partial-path overlaps the target point and no unexpanded path exists in the queue, in which case the path with the smallest max length L among all the kept paths that reach the target point is selected as the shortest length legal path. No unexpanded path exists in the queue when each of the multitude of partial-paths in the queue includes the increment. Therefore, the stopping criteria is also not met if the partial-path does not overlap the target point, or at least one of the plurality of partial-paths in the queue is not expanded, i.e. does not include the increment.

Figure 9:
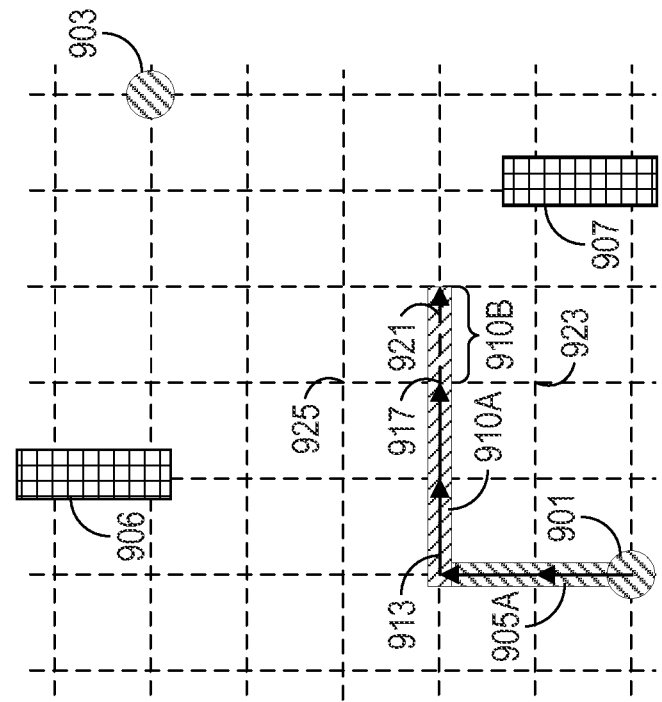
FIG. 9 depicts a simplified example of expanding a selected partial-path, in accordance with one embodiment of the present invention.

FIG. 9 depicts a simplified example of expanding a selected partial-path, which includes M1 wire segment 905A and a portion of M2 wire segment 910A, in accordance with one embodiment of the present invention. The selected partial-path starts at source point 901 and is routed around two M2 blockages 906, 907 towards target 903. During previous iterations, the router created the selected partial-path in increments indicated by the multitude of solid arrows 913 ending at point 917, which are superimposed over M1 wire segment 905A and M2 wire segment 910A. The router connects a new M2 increment 910B represented by dashed arrow 921 to an end of the selected partial-path at point 917 opposite the source point 901 location to form an expanded partial-path equal to M1 wire segment 905A and M2 wire segment 910A plus M2 increment 910B. In other words, the router iteratively builds a multitude of partial-paths to route a connection in a circuit design by adding an incremental length to a selected previously built partial-path. However, the router avoids expanding a partial-path over any infeasible points when such points were identified previously. Because the selected partial-path ending at point 917 is still in the queue, the router may subsequently expand the end of the selected partial-path at point 917 to any other feasible neighboring grid point, such as 923 and 925, thereby generating other partial-paths during future iteration. The router may exhaustively and iteratively generate all possible legal partial-paths but does not store them all as explained below.

Referring again to FIG. 7, the router checks 770 if there is enough space to extend the last wire segment. Checking for extensions includes extending the expanded partial-path when the expanded partial-path violates the minimum wire-length design-rule and determining if a violation of any other rule occurs because of the extensions. The extended, expanded partial-path is discarded, i.e. not later saved in the queue, when the extended, expanded partial-path violates any rules. In one embodiment, the extended, expanded partial-path is discarded when it violates a design rule associated with a rule different than either the minimum segment spacing or minimum segment length rules described earlier. In other words, the increment length is in accordance with at least the minimum segment length related design rules.

The router may visit, e.g. expand, a partial path to a feasible grid point more than once and thus generate redundant partial-paths, which would, if all such redundant partial-paths were saved, create an exponentially increasing number of partial-paths to save and thereby increase run time. Instead, if the expanded partial-path in the queue is redundant with another partial-path in the queue, the router prunes 780 or eliminates unnecessary expanded partial-paths based on evaluating or comparing the associated S and L length values of the most recently expanded partial path and another partial-path that is redundant and previously stored in the queue. Pruning includes determining the S and L lengths of the expanded partial-path. By evaluating the S and L values of the partial-path, the router selectively keeps only partial-paths that may be extended to a shortest final path since partial-paths leading to longer paths are deemed unnecessary or undesired.

The router eliminates the expanded partial-path or another one of the multitude of partial-paths that is redundant, previously built, and stored in the queue, hereinafter also referred to as the second partial-path, when an end of the expanded partial-path opposite the source point is coterminous with an end of the second partial-path. The pruning may be based on or in accordance with evaluating the S and L values of the expanded partial-path compared to the associated S and L values of the second partial-path. In other words, when two partial-paths start from the same source point and end on a common grid point, the router compares each of the partial-paths to each other and selects a partial-path leading to a shorter final path to keep. The other partial-path that does not lead to the shorter final path is eliminated. The lengths S, L are used to identify a minimum length path between the source point and a target point.

The evaluation includes two parts. For both parts of the evaluation, let P and P' be two partial-paths (continuing the above example, the expanded partial-path may be either P or P') both expanded from the same source point and both having ends opposite the source point at the same grid point, g, i.e. point 917 depicted in FIG. 9. The min, max lengths of P and P' are S, L and S', L' respectively.

The first part of the evaluation eliminates, i.e. prunes from the queue, the expanded partial-path when S of the expanded partial-path is longer than or equal to L of the second partial-path. Alternatively, the evaluation eliminates the second partial-path when S of the second partial-path is longer than or equal to L of the expanded partial-path. In other words, when the min length S of P is longer than or equal to the max length L' of P', then P is pruned. This is because, as proven below, the length of any full path expanded from partial-path P will be longer than or equal to the full path expanded from partial-path P' from the common end point opposite the source, e.g. grid point 917 in FIG. 9 or grid point g in FIGS. 11A, 11B, to the target.

The second part of the evaluation eliminates, i.e. prunes from the queue, either the expanded partial-path or the second partial-path when S of the expanded partial-path is equal to S of the second partial-path and when L of the expanded partial-path is equal to L of the second partial-path. In other words, if P and P' have the same max length and the same min length, P is pruned. That is because any full path expanded from P has the same path length as that of the full path expanded from P' from the common end point opposite the source, e.g. grid point 917 in FIG. 9 or grid point g in FIGS. 11A, 11B, to the target, which will be proven below.

The router next adds 790 or stores the feasible new expanded partial-path into the queue. In other words, the router saves the S and L of the expanded partial-path along with the expanded partial-path in the queue when the expanded partial-path has not been discarded or eliminated in previous steps 770, 780. Then the router iteratively repeats selecting 730, determining the stopping criteria 740, connecting 760, extending 770, determining the violation 770, discarding 770, determining the first and second length 780, eliminating 780, and saving 790 until the stopping criteria at 740 is met.

FIG. 10A depicts a first example of a nearly complete partial-path, to point 1017 by further expanding the same partial-path depicted in FIG. 9, which extended previously to point 917, in accordance with one embodiment of the present invention. FIG. 10A depicts that the nearly complete partial-path called pA, which is identified by the multitude of solid arrows 1013A ending at point 1017, includes M1 wire segments 1005A, 1005B and a portion of M2 wire segment 1010A. The minimum wire length is three pitches, which requires M1 wire segment 1005A to include an extension inside dotted and dashed rectangle 1025A that is one pitch long. According to the definitions above, pA has S and L values equal to 10 and 11 pitches, respectively. At the present iteration in the router, M1 wire segment 1005B has been expanded to two pitches and will need an additional third pitch to meet the minimum wire length rule, hence L for pA is 11. The third pitch increment that will be added to M1 wire segment 1005B in the next iteration of the router as depicted by dashed arrow 1021, which will form the complete or final future path, pA', thereby forming a continuous conductive path pA' from source 901 all the way to target 903. Future path pA' has S and L values equal to 11 and 11 pitches, respectively.

FIG. 10B depicts a second example of a nearly complete partial-path to point 1017 using the same blockages 906, 907 and respective source, target points 901, 903 as depicted in FIG. 9, in accordance with one embodiment of the present invention. FIG. 10B depicts that the nearly complete partial-path called pB, which is identified by the multitude of solid arrows 1013B ending at point 1017, includes M1 wire segment 1005C, M2 wire segment 1010B, and a M1 point segment at point 1017. According to the definitions above, pB has S and L values equal to 9 and 12 pitches, respectively. At the present iteration in the router, M1 wire segment 1005D is a point segment at point 1017. Because the minimum wire length is again three pitches long, M1 point segment at point 1017 will include a future extension of at least three pitches, hence L for pB is 12. In the next iteration of the router one M1 increment will be added to the M1 point segment at 1017 as depicted by dashed arrow 1021, which will form the un-extended future path, pB', thereby forming a continuous conductive path pB' from source 901 all the way to target 903. However, to meet the minimum wire length rule, pB' may include a two pitch M1 extension inside dotted and dashed rectangle 1025B. Thus, pB' has S and L values equal to 10 and 12 pitches, respectively.

Referring simultaneously to FIGS. 7, 10A and 10B, assume pA is in the queue and pB is the result of a new path expansion during the present routing iteration. According to an embodiment of the present invention, the router evaluates both pA and pB at step 780 because pA and pB end at the same grid point 1017 opposite source point 901. Because S of pB, which is 9, is not longer than L of pA, which is 11, pB is not eliminated or pruned. Further, because S of pA, which is 10, is not longer than L of pB, which is 12, pA is not eliminated. Thus, both pA and pB are kept in the queue during the present routing iteration.

During a future iteration of the routing, whichever path, pA or pB are selected, the router finds the stopping criteria is not met since neither path overlaps point 903. Assuming pA' is expanded first and pB remains in the queue, then the stopping criteria is not met because L of pA', which is 11, is longer than S of pB, which is 9. Alternatively, if pB' is expanded first and pA remains in the queue, then the stopping criteria is not met because L of pB', which is 12, is longer than S of pA, which is 10. Therefore, the router continues to iterate eventually expanding both pA' and pB'. Thus the router will keep the future shortest path which will be pA' even though in the present iteration pB appears shorter without its extensions.

The S and L values discussed above in reference to FIGS. 10A-10B are summarized in table 1 below.

TABLE 1

| Iteration | Path | S (pitches) | L (pitches) |
|---|---|---|---|
| Present | pA | 10 | 11 |
| | pB | 9 | 12 |
| Future | pA' | 11 | 11 |
| | pB' | 10 | 12 |

When both pB' and pA' are expanded, the evaluation is again done but because S of pB', which is 10, is not longer than L of pA', which is 11, pB' is not eliminated or pruned. Further, because S of pA', which is 11, is not longer than L of pB', which is 12, pA' is not eliminated. Thus both pA' and pB' are kept in the queue during the routing iteration that does their evaluation during pruning step 780.

Assume in a future iteration pB' is selected and the stopping criteria is checked finding that L of pB', which is 12, is longer than S of pA', which is 11, thus the stopping criteria is not met. The router then does not add an increment to pB' because target 903 is already connected to pB'. Upon later selecting pA', the stopping criteria is checked finding that L of pA', which is 11, is longer than S of pB', which is 10, thus the stopping criteria is not met. In this example depicted by FIGS. 10A-10B, neither pA' nor pB' meet the stopping criteria. Therefore, the router continues to get an unexpanded partial-path from the top of the queue until some path meets the stop criteria or no more unexpanded path exists in the queue.

Figure 11B:
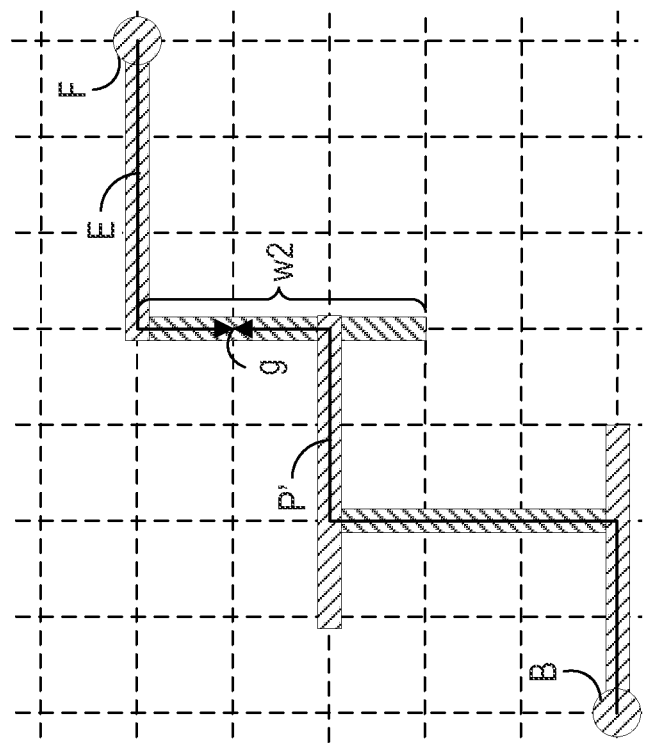
FIG. 11A and FIG. 11B respectively depict a first full path and a second full path, used to demonstrate one part of the evaluation during the pruning step depicted in FIG. 7, in accordance with one embodiment of the present invention.
Figure 11A:
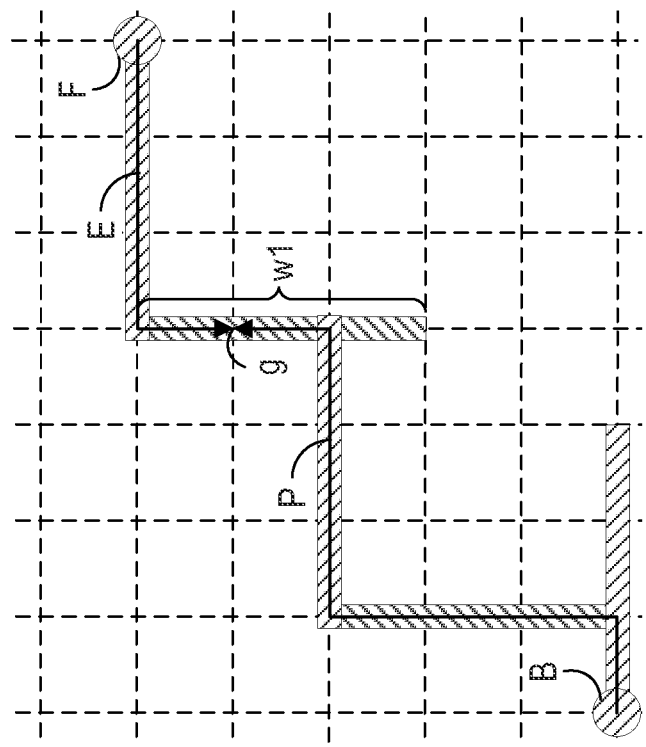

FIG. 11A and FIG. 11B respectively depict a first full path, $P_1$, and a second full path, $P_2$, used to demonstrate one part of the evaluation during pruning step 780 depicted in FIG. 7, in accordance with one embodiment of the present invention. $P_1$ and $P_2$, both have the same start and end point B and F, respectively. FIG. 11A depicts $P_1$ is partial-path P, plus extended partial-path E, as depicted by two solid arrows. FIG. 11B depicts $P_2$ is partial-path P', plus extended partial-path E. Both P and P' end at the same point g. Elements $w_1$ and $w_2$ are wire segments containing g in $P_1$ and $P_2$ respectively. E is the same in both $P_1$ and $P_2$, containing the extension required to meet a three pitch minimum wire length design rule.

Referring simultaneously to FIGS. 11A and 11B, $w_1$ and $w_2$ are wire segments containing the grid point g. The length of a partial-path is undetermined because the last wire segment is not finalized. In other words, the lengths of all wire segments except the last one are known. The uncertainty of the length of a partial-path length is due to the last wire segment, whose length depends on whether the last wire segment requires extensions or not. It is not known what kind of extensions would be required for the last wire segment until that segment is finally placed. Therefore, the following case analysis focuses on the last wire segments containing g, i.e. w1 and w2. In this example, g is on M1, and the minimum wire length is three pitches long. Let P and P' be partial-paths from the same source B and expanded to the same grid point. It will be shown that if P and P' have the same max lengths and the same min lengths, then any full path expanded from P has the same path length as that of the full path expanded from P' with the same extended partial-path, E, from the ends of both partial-paths, P and P' at g expanded to the target. Let $P_1$ and $P_2$ be the full paths extended from P and P' with the same extended partial-path. $P_1$ and $P_2$ may be classified into the following three cases. It will be shown that $L(P_1)=L(P_2)$ in the first two cases, where L( ) is the full length of a path plus all extensions, and the last case does not exist.

Case 1 is when $w_1$ and $w_2$ contain no extensions (not shown in FIGS. 11A and 11B). Since $w_1$ does not contain extensions, the length of P is min(P) and the length E is min(E), where min( ) is the min length of a partial-path, and min(E) is the min length of E by assuming t as the source. Then, $L(P_1)$=min(P)+min(E). Likewise, since $w_2$ does not contain extensions, $L(P_2)$=min(P')+min(E). Since min(P)=min(P') by the original assumptions, then $L(P_1)$=$L(P_2)$.

Case 2, as exemplified in FIGS. 11A and 11B, is the case where $w_1$ and $w_2$ both contain extensions. Let P∪$w_1$ be the partial-path P containing $w_1$. Since $w_1$ contains extensions, the length of $w_1$ is part of the total wire length of P and the length of P∪$w_1$ is max(P), where max( ) is the max length of a partial-path. Let E' be the path $P_1$ excluding P∪$w_1$. $L(P_1)$=max(P)+max(E'), where max(E') is the max length of E' by assuming t as the source. Likewise, $L(P_2)$=max(P')+max(E'). Since max(P)=max(P') by the original assumptions, $L(P_1)$=$L(P_2)$.

Case 3 is when only one of $w_1$ and $w_2$ contain extensions (not shown in FIGS. 11A and 11B). From the definitions for min and max length, the difference between the max length and the min length is the length of the required extensions of the last expanded wire segment. Since P and P' have the same max length and the same min length, the last wire segments of both these two partial-paths require either no extensions in both P and P' or extensions in both P and P' with the same total wire length, conflicting with the premise of this case that only one of $w_1$ and $w_2$ contain extensions. Thus, this case does not exist. Thus we can conclude $L(P_1)$=$L(P_2)$.

Referring to FIG. 7, the time complexity of identifying 710 grid points or locations that would violate the end-end separation design rule is O(n). In step 710, the feasibility of creating a wire unit for each grid point is checked. Since there is only a limited number of wire segments around a point, the checking for a point under a rule is O(1). Because a limited number of rules are checked, the time complexity of the checking is O(1) for one point, and O(n) for all n points.

Figure 12:
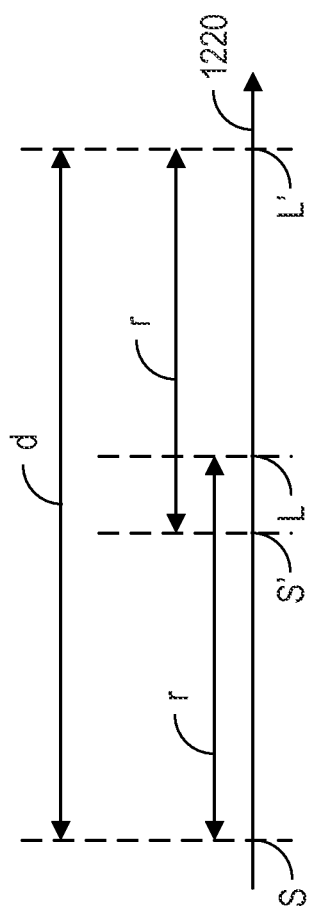
FIG. 12 depicts an example of the difference between the max length of one partial-path and the min length of another partial-path, in accordance with one embodiment of the present invention.

FIG. 12 depicts an example of the difference, d, between the max length L' of one partial-path P' and the min length S of another partial-path P, in accordance with one embodiment of the present invention. Assume two partial-paths, P and P', both starting from the same start point B and both ending at the same grid point g. By definition, S and L, are the min and max lengths, respectively, of partial-path P. Likewise, S' and L' are the min and max lengths, respectively, of partial-path P'. Irrespective of the original routing directions, on the layout, FIG. 12 depicts the locations of S, L, S', and L' on an integer number scale 1220 increasing in value to the right, where the coincident starting point B of both partial-paths P and P' is off the figure towards the left direction. Without any loss of generality, assume that $$L' > L \qquad \text{eq. 1.}$$

It will be shown that the time complexity of routing steps 720-790, which create partial-paths, is O(n) and that the number of created partial-paths is O(n). To eliminate the effects of overhanging wire segment dimensions beyond a grid point due to finite wire width, assume that the idealized length of a wire segment that is only a single grid point in length is equal to zero. Furthermore, let d be the difference between the max length L' of one partial-path and the min length S of another partial-path, i.e.

$$L' - S = d \qquad \text{eq. 2,}$$

as provided by the first pruning strategy, according to one embodiment of the invention.

Because the first pruning strategy ensures that the min length S' of one partial-path P' is never longer than or equal to the max length L of another partial-path P, i.e.

$$S' < L \qquad \text{eq. 3,}$$

it will be shown that, $$L' - S = d \le 2r - 1 \qquad \text{eq. 4,}$$

where the minimum wire-length design-rule is assumed to be r. It is a given that for a partial-path, the difference between the max length and min length is ≤r. Then, $$L' - S' \le r \qquad \text{eq. 5, and}$$

$$L - S \le r \qquad \text{eq. 6,}$$

which dimensions are depicted in FIG. 12 for L'−S'=r and L−S=r, along with the dimension d.

From equation 3;

$$S' \le L - 1 \qquad \text{eq. 7.}$$

Rearranging equation 5 gives;

$$L' \le r + S' \qquad \text{eq. 8.}$$

Substituting S' from equation 7 in equation 8 gives;

$$L' \le r + L - 1 \qquad \text{eq. 9.}$$

Rearranging equation 6 gives;

$$L \le r + S \qquad \text{eq. 10}$$

Substituting L from equation 10 in equation 9 gives;

$$L' \le r + r + S - 1 \qquad \text{eq. 11.}$$

Rearranging equation 11 gives;

$$L' - S \le 2r - 1 \qquad \text{eq. 12.}$$

Substituting d from equation 2 in equation 12 proves;

$$d \le 2r - 1 \qquad \text{eq. 13.}$$

FIG. 12 further explains how many possible partial-paths reach or end at the same point g. According to the pruning strategies, some partial-paths reaching a point g will be discarded. To analyze the time complexity, an estimate is done of how many possible partial-paths may be kept. FIG. 12 depicts that among all kept partial-paths reaching the same end point g, the range between all min and max lengths is 2r−1. Based on this, we can estimate the number of all kept partial-paths that reach or end at the same point. The maximum L'−S is 2r−1, and S'=L−1.

According to an embodiment of the present invention, the second pruning strategy ensures there are no two partial-paths with the same min and the same max lengths because one is pruned. As mentioned above, since the maximum of d is 2r−1, all min and max lengths of partial-paths connecting to the same grid point g are bounded in a range with size d=2r−1, as assumed in the following. Then, the number of partial-paths each having different max length and min length is no more than C(d,2), where C(d,2) is a 2-combination of a set with size d. The number of partial-paths each having the same max and min lengths is no more than d. Therefore, the total count of partial-paths connecting to the same grid point is no more than C(d,2)+d. Thus, the number of partial-paths connecting to all grid points is no more than n·(C(d,2)+d). In practice, d is a small constant. Thus, the number of total created partial-paths is O(n). In the embodiments described herein, creating a partial-path is to create a step with the previous step assigned as the starting step of the expanded partial-path. Thus, the time complexity of creating a partial-path is O(1), and the time complexity of routing steps 730-790 is O(n). Thus, the time complexity of the router is O(n).

It can be shown that the new router finds a shortest path. Let the found path be P. It is first shown that without path pruning the router will find a shortest path, and then show that the lengths of all pruned paths are no less than the path length of P. Thus, the found path is a shortest path.

Without pruning, the router exhaustively searches partial-paths until the min lengths of all kept partial-paths are no less than L(P), where L( ) is the max length of a path. We assume there is a path P'={$g_1, g_2 \ldots g_n$} with path length less than L(P), where $g_1 \ldots g_n$ are grid points along the path P'. The initial partial-path {$g_1$} is first selected for expansion. Since the length of a path is no less than the min lengths of its partial-paths, the min length of {$g_1, \ldots g_m$}≤L(P')<L(P), where 1≤m<n. Thus, the router can search {$g_1, \ldots g_{m+1}$} by expanding {$g_1, \ldots g_m$} since the min length of {$g_1, \ldots g_m$}<L(P), and finally P'={$g_1, g_2 \ldots g_n$} is found. Since L(P')<L(P), the resulting path should be P' creating a contradiction. Therefore, P should be a shortest path.

With path pruning, the new router can find a shortest path. According to the pruning strategies, the router prunes only paths expanding from partial-paths that can be replaced by the kept partial-paths without increasing the path lengths. When considering path pruning, no path with the length shorter than the resulting path length is pruned. Thus a shortest path can still be found.

The embodiments of the present invention were integrated into a commercial router, herein also referred to as the "integrated-router", to replace the searching kernel of the commercial router and do the following experiments. The original searching recipe of the commercial router is based on an existing recipe, and rule violations are corrected by post-processing. By integrating the router, the router first routes nets under wiring rules related to the end-end separation and the minimum wire length, and then resolves other violations by the original post-processing recipe. According to step 770, a new partial-path that violates a rule is discarded. However, in application, it is possible that no legal path exists from a source to a target, resulting in an open net if not dealt with specially. Because those two unconnected source and target points should be connected even if there is a rule violation, that illegal partial-path is still created and insert into the queue. Accordingly, step 770 of the router was modified by assigning a large minimum wire length value when such an unsolvable rule violation is encountered in order to add a measurable cost factor. In this way, a path between two points can always be found. All experiments are performed on a workstation with a 2-GHz AMD64™ dual-CPU, Linux OS and 32G of memory.

Table 2 shows the statistics for seven circuit routing cases that were evaluated experimentally, and C3 is used for benchmarking. The #inst is equal to the number of instantiations of a cell master. For C3, there are 32,313 violations generated by the original router before post-processing. However, only 1,816 violations are generated after integrating the router using embodiments of the present invention. Therefore 94% of the violations produced by the original commercial router are resolved by applying the integrated-router using embodiments of the present invention.

TABLE 2

| Case | #inst  | #nets  | Process (nm) |
|------|--------|--------|--------------|
| C1   | 68,472 | 12,752 | 65           |
| C2   | 1,558  | 1,775  | 40           |

TABLE 2-continued

| Case | #inst  | #nets  | Process (nm) |
|------|--------|--------|--------------|
| C3   | 8,971  | 11,210 | 40           |
| C4   | 2,221  | 407    | 40           |
| C5   | 9,984  | 1,837  | 40           |
| C6   | 9,984  | 1,837  | 28           |
| C7   | 11,894 | 11,210 | 28           |

Based on the results, the following two conclusions are reached. First, the router largely reduces rule violations. In addition, the total wire length is reduced by 3% and the runtime is reduced by 2.4 times on average. Second, the new router has larger runtime improvement ratios if the minimum wire length becomes longer.

Tables 3A-3B shows a comparison of the routing performance with and without the new router. "W.L." stands for total wirelength, #vio stands for the total rule violations, t-r, w-r and v-r are the original router to integrated-router ratios of runtime, wire length and via count.

TABLES 3A

| | Original router | | | |
|---|---|---|---|---|
| Case | Time (sec) | W.L. (mm) | #via | #vio |
| C1 | 293 | 237,084 | 142,541 | 0 |
| C2 | 16 | 32,943 | 14,356 | 45 |
| C3 | 148 | 111,359 | 90,504 | 0 |
| C4 | 105 | 9,796 | 3,373 | 12 |
| C5 | 492 | 27,294 | 17,201 | 0 |
| C6 | 188 | 17,295 | 15,924 | 38 |
| C7 | 209 | 88,563 | 74,553 | 0 |

TABLES 3B

| | Integrated-router | | | |
|---|---|---|---|---|
| Case | Time (sec) | W.L. (mm) | #via | #vio |
| C1 | 150 | 230,178 | 138,384 | 0 |
| C2 | 7 | 31,983 | 14,220 | 0 |
| C3 | 75 | 108,115 | 88,742 | 0 |
| C4 | 31 | 9,618 | 3,357 | 0 |
| C5 | 101 | 26,500 | 17,045 | 0 |
| C6 | 170 | 16,950 | 15,761 | 4 |
| C7 | 183 | 85,951 | 74,625 | 0 |

TABLES 3C

| | Comparison | | |
|---|---|---|---|
| Case | t-r | w-r | v-r |
| C1 | 2.0 | 1.03 | 1.03 |
| C2 | 2.3 | 1.03 | 1.01 |
| C3 | 2.0 | 1.03 | 1.02 |
| C4 | 3.4 | 1.02 | 1.00 |
| C5 | 4.9 | 1.03 | 1.01 |
| C6 | 1.1 | 1.02 | 1.01 |
| C7 | 1.1 | 1.03 | 1.00 |
| Avg. | 2.4 | 1.03 | 1.01 |

The original router cannot completely route cases C2, C4 and C6 without violations. The success rate of the original router is only 57%. By integrating the new router, the router successfully routes C2 and C4 with no violations. The success rate of the integrated-router router is 86%. Therefore, the integrated-router improves the routing success rate by 29%. The runtime reductions of C6 and C7 are small compared to those of other cases. This is because pins, i.e. source and target points of these two 28-nm cases are densely distributed in the lowest two layers that also affect the ability to do the routing. However, the overall average runtime is still reduced by 2.4 times. Further, the integrated-router is able to find legal shortest paths, thus the total wire length is reduced by 3% on average. In addition, the via count is also slightly reduced by 1% on average.

Figure 13:
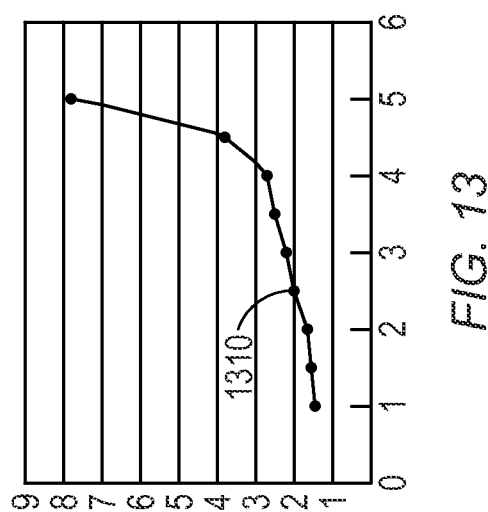
FIG. 13 depicts exemplary results of a constrained maze routing.

As process shrunk the required minimum wire length is becoming longer when normalized to a pitch. FIG. 13 depicts exemplary results of a constrained maze routing for case C3. The vertical axis shows the runtime ratio or routing time comparison t-r and the horizontal axis shows the minimum required wire-length design-rule in (pitches). The point 1310 represents a 40 nm process. FIG. 13 shows that the constrained maze routing is more effective in cases of longer minimum wire length. The runtime improved ratio is higher for the case with longer required minimum wire length. This indicates that the new router is more effective if the minimum wire length becomes longer in future processes.

Figure 14:
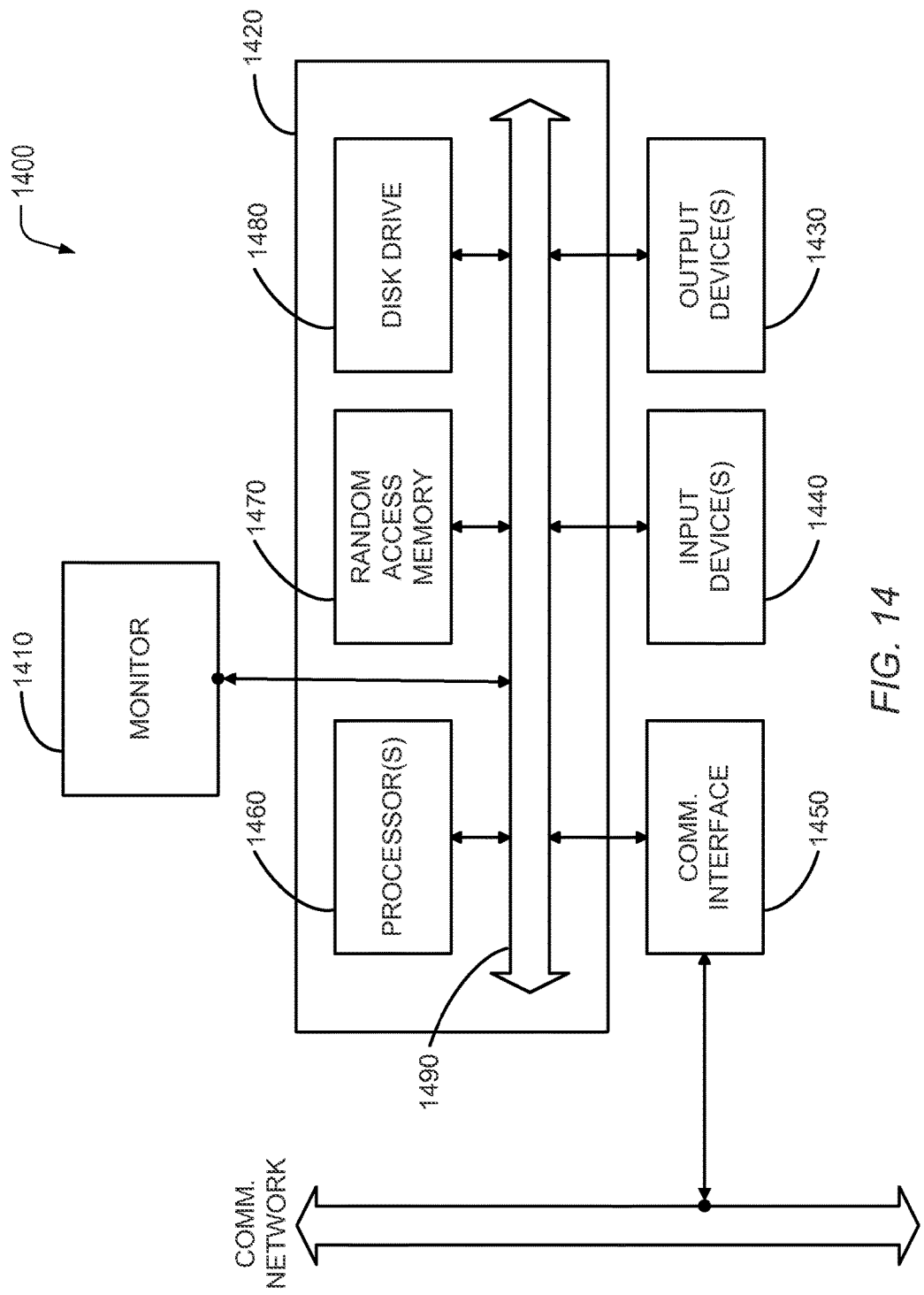
FIG. 14 is a block diagram of a computer system that may incorporate embodiments of the present invention.

FIG. 14 is a simplified block diagram of a computer system that may incorporate embodiments of the present invention. FIG. 14 is merely illustrative of an embodiment incorporating the present invention and does not limit the scope of the invention as recited in the claims. One of ordinary skill in the art would recognize other variations, modifications, and alternatives.

In one embodiment, computer system 1400 typically includes a monitor 1410, a computer 1420, user output devices 1430, user input devices 1440, communications interface 1450, and the like.

As shown in FIG. 14, computer 1420 may include a processor(s) 1460 that communicates with a number of peripheral devices via a bus subsystem 1490. These peripheral devices may include user output devices 1430, user input devices 1440, communications interface 1450, and a storage subsystem, such as random access memory (RAM) 1470 and disk drive 1480.

User input devices 1430 include all possible types of devices and mechanisms for inputting information to computer system 1420. These may include a keyboard, a keypad, a touch screen incorporated into the display, audio input devices such as voice recognition systems, microphones, and other types of input devices. In various embodiments, user input devices 1430 are typically embodied as a computer mouse, a trackball, a track pad, a joystick, wireless remote, drawing tablet, voice command system, eye tracking system, and the like. User input devices 1430 typically allow a user to select objects, icons, text and the like that appear on the monitor 1410 via a command such as a click of a button or the like.

User output devices 1440 include all possible types of devices and mechanisms for outputting information from computer 1420. These may include a display (e.g., monitor 1410), non-visual displays such as audio output devices, etc.

Communications interface 1450 provides an interface to other communication networks and devices. Communications interface 1450 may serve as an interface for receiving data from and transmitting data to other systems. Embodiments of communications interface 1450 typically include an Ethernet card, a modem (telephone, satellite, cable, ISDN), (asynchronous) digital subscriber line (DSL) unit, FireWire interface, USB interface, and the like. For example, communications interface 1450 may be coupled to a computer network, to a FireWire bus, or the like. In other embodiments, communications interfaces 1450 may be physically integrated on the motherboard of computer 1420, and may be a software program, such as soft DSL, or the like.

In various embodiments, computer system 1400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1420 includes one or more Xeon microprocessors from Intel as processor(s) 1460. Further, one embodiment, computer 1420 includes a UNIX-based operating system.

RAM 1470 and disk drive 1480 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 1470 and disk drive 1480 may be configured to store the basic programming and data constructs that provide the functionality of the present invention.

Software code modules and instructions that provide the functionality of the present invention may be stored in RAM 1470 and disk drive 1480. These software modules may be executed by processor(s) 1460. RAM 1470 and disk drive 1480 may also provide a repository for storing data used in accordance with the present invention.

RAM 1470 and disk drive 1480 may include a number of memories including a main random access memory (RAM) for storage of instructions and data during program execution and a read only memory (ROM) in which fixed instructions are stored. RAM 1470 and disk drive 1480 may include a file storage subsystem providing persistent (non-volatile) storage for program and data files. RAM 1470 and disk drive 1480 may also include removable storage systems, such as removable flash memory.

Bus subsystem 1490 provides a mechanism for letting the various components and subsystems of computer 1420 communicate with each other as intended. Although bus subsystem 1490 is shown schematically as a single bus, alternative embodiments of the bus subsystem may utilize multiple busses.

FIG. 14 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 15:
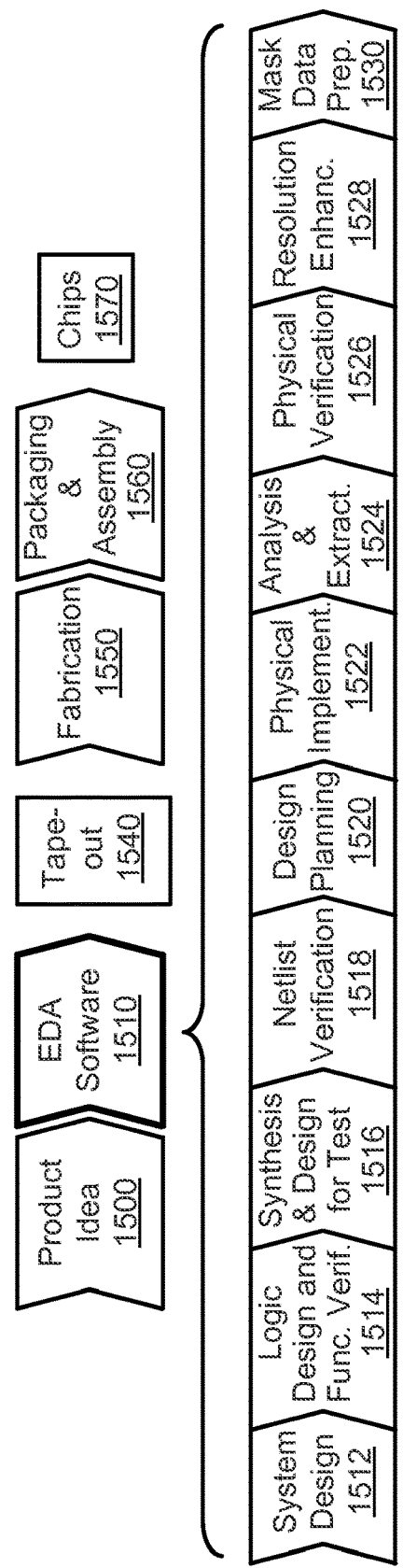
FIG. 15 depicts simplified exemplary steps in the design and fabrication of an integrated circuit that may use embodiments of the present invention.

FIG. 15 depicts simplified exemplary steps in the design and fabrication of an integrated circuit that may use embodiments of the present invention. The process starts with a product idea 1500, which is realized using Electronic Design Automation (EDA) software 1510. Chips 1570 can be produced from the finalized design by performing fabrication 1550 and packaging and assembly 1560 steps. An exemplary design flow that uses EDA software 1510 is described below for illustration purposes only. For example, an actual integrated circuit design may require a designer to perform the design flow steps in a different sequence than the sequence described below.

In the system design 1512, a designer describes the functionality to be implemented. The designer can also perform what-if planning to refine the functionality and to check costs. Further, hardware-software architecture partitioning can occur at this step. In the design and functional verification 1514, a Hardware Description Language (HDL) design may be created and checked for functional accuracy.

In the synthesis and design 1516, the HDL code can be translated to a netlist, which can be optimized for the target technology. Further, tests can be designed and implemented to check the finished chips. In the netlist verification 1518, the netlist can be checked for compliance with timing constraints and for correspondence with the HDL code. In the design planning 1520, an overall floor plan for the chip can be constructed and analyzed for timing and top-level routing. Next, in the physical implementation 1522, placement and routing can be performed.

In the analysis and extraction 1524, the circuit functionality can be verified at a transistor level. In the physical verification 1526, the design can be checked to correct any functional, manufacturing, electrical, or lithographic issues. In the resolution enhancement 1528, geometric manipulations can be performed on the layout to improve manufacturability of the design. Finally, in the mask data preparation 1530, the design can be taped-out 1540 for production of masks to produce finished chips. The embodiments of the present invention may be used, for example at the steps of design planning 1520 and/or physical implementation 1522.

Various embodiments of the present invention can be implemented in the form of logic in software or hardware or a combination of both. The logic may be stored in a computer readable or machine-readable storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The specification and drawings are, accordingly, to be regarded in an illustrative rather than a restrictive sense. However, it will be evident that various modifications and changes may be made thereunto without departing from the broader spirit and scope of the invention as set forth in the claims. In addition, the technique and system of the present invention is suitable for use with a wide variety of EDA tools and methodologies for designing, testing, and/or manufacturing integrated circuits or other electronic devices. The scope of the invention should, therefore, be determined not with reference to the above description, but instead should be determined with reference to the pending claims along with their full scope or equivalents.

What is claimed is:

1. A computer implemented method for routing a first path in a circuit design, the method comprising:

iteratively building, using the computer, a plurality of partial-paths to route the first path by adding an incremental length to a selected previously built partial-path when the computer is invoked to route the first path in the circuit design, the adding being performed in accordance with at least a first design rule, wherein the plurality of partial-paths start at a first location, wherein said iteratively building comprises:

comparing, using the computer, the plurality of partial-paths to each other when the plurality of partial-paths end on a common second location different from the first location;

saving, using the computer, one of the plurality of partial-paths that leads to a shortest first path; and eliminating, using the computer, one of the plurality of partial-paths that is not selected to lead to the shortest first path.

2. The computer implemented method of claim 1, wherein the first design rule is associated with a spacing of the incremental length to a second path.

3. The computer implemented method of claim 1, wherein each of the plurality of partial-paths is a continuous electrical conductor that is unbroken by passive or active components.

4. The computer implemented method of claim 1, wherein the plurality of partial-paths start at a first location, wherein the incremental length is added to a first end of the selected previously built partial-path, the first end being disposed opposite a second end adjacent the first location.

5. The computer implemented method of claim 1 further comprising:

repeating the iterative building to find the first path when a stop criteria is not met, wherein the stop criterion is not met when the selected previously built partial-path does not overlap a target location or the length of the selected previously built partial-path that overlaps the target location is longer than the length of any other one of the plurality of partial-paths.

6. The computer implemented method of claim 1 further comprising:

repeating the iterative building to find the first path when a stop criteria is not met, wherein the stop criterion is not met when the selected previously built partial-path does not overlap a target location or at least one of the plurality of partial-paths in a queue does not include the incremental length.

7. The computer implemented method of claim 1 further comprising:

extending, using the computer, the length of a portion of one of the plurality of partial-paths thereby forming an extended partial-path when the portion violates a second design rule different from the first design rule.

8. The computer implemented method of claim 7, wherein the portion is built from a continuous conductive line on a single conductive layer.

9. The computer implemented method of claim 7, wherein the second design rule is associated with a minimum length of the portion.

10. The computer implemented method of claim 7 further comprising:

saving, using the computer, the extended partial-path when the extended partial-path does not violate a third design rule different than the first and second design rules.

11. The computer implemented method of claim 1, wherein the plurality of partial-paths start at a first location, the method further comprising:

saving, using the computer, a first length and a second length associated with each of a different one of the plurality of partial-paths; and determining, using the computer, one of the plurality of partial-paths that leads to a shortest first path when the plurality of partial-paths end on a common second location different from the first location, the determining being in accordance with the saved first length and second length.

12. The computer implemented method of claim 11 further comprising:

saving, using the computer, one of the plurality of partial-paths that leads to a shortest first path; and eliminating, using the computer, one of the plurality of partial-paths that are not selected to lead to the shortest first path.

13. The computer implemented method of claim 11, wherein the selected previously built partial-path plus the added incremental length form an expanded partial-path, wherein the method further includes eliminating either the expanded partial-path or the selected previously built partial-path when the first length of the expanded partial-path is equal to the first length of the selected previously built partial-path and when the second length of the expanded partial-path is equal to the second length of the selected previously built partial-path.

14. The computer implemented method of claim 11, wherein the selected previously built partial-path plus the added incremental length form an expanded partial-path, wherein the method further includes eliminating the selected previously built partial-path when the first length of the selected previously built partial-path is longer than or equal to the second length of the expanded partial-path.

15. The computer implemented method of claim 11, wherein the selected previously built partial-path plus the added incremental length form an expanded partial-path, wherein the method further includes eliminating the expanded partial-path when the first length of the expanded partial-path is longer than or equal to the second length of the selected previously built partial-path.

16. The computer implemented method of claim 15, wherein the first length does not include a length associated with a portion of the expanded partial-path that is expanded so as not to violate a second design rule different from the first design rule.

17. The computer implemented method of claim 15, wherein the second length includes a length associated with a portion of the selected previously built partial-path that is expanded so as not to violate a second design rule different from the first design rule.

* * * * *